United States Patent
Bolz et al.

(10) Patent No.: US 9,436,971 B2
(45) Date of Patent: Sep. 6, 2016

(54) SYSTEM, METHOD, AND COMPUTER PROGRAM PRODUCT FOR ACCESSING MULTI-SAMPLE SURFACES

(71) Applicant: NVIDIA Corporation, Santa Clara, CA (US)

(72) Inventors: Jeffrey Alan Bolz, Austin, TX (US); Patrick R. Brown, Wake Forest, NC (US); Tyson Bergland, San Francisco, CA (US); Alexander Lev Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 141 days.

(21) Appl. No.: 13/970,542

(22) Filed: Aug. 19, 2013

(65) Prior Publication Data
US 2014/0267376 A1 Sep. 18, 2014

Related U.S. Application Data

(63) Continuation of application No. 13/844,095, filed on Mar. 15, 2013, now Pat. No. 9,262,797.

(51) Int. Cl.
*G06T 11/40* (2006.01)
*G06T 1/60* (2006.01)
*G06T 5/00* (2006.01)

(52) U.S. Cl.
CPC .............. *G06T 1/60* (2013.01); *G06T 5/002* (2013.01); *G06T 11/40* (2013.01)

(58) Field of Classification Search
None
See application file for complete search history.

(56) References Cited

U.S. PATENT DOCUMENTS

| | | | |
|---|---|---|---|
| 6,614,449 B1 * | 9/2003 | Morein | 345/611 |
| 6,720,975 B1 | 4/2004 | Dietrich, Jr. | |
| 6,825,847 B1 * | 11/2004 | Molnar et al. | 345/611 |
| 7,126,615 B2 | 10/2006 | Liao | |
| 7,162,092 B2 | 1/2007 | Glickman et al. | |
| 8,086,806 B2 | 12/2011 | Nyland et al. | |

(Continued)

FOREIGN PATENT DOCUMENTS

| | | |
|---|---|---|
| CN | 101198982 A | 6/2008 |
| CN | 101620725 A | 1/2010 |

(Continued)

OTHER PUBLICATIONS

Non-Final Office Action from U.S. Appl. No. 13/844,095, Mar. 3, 2015.

(Continued)

*Primary Examiner* — Kee M Tung
*Assistant Examiner* — Nicholas R Wilson
(74) *Attorney, Agent, or Firm* — Zilka-Kotab, PC

(57) ABSTRACT

A system, method, and computer program product are provided for accessing multi-sample surfaces. A multi-sample store instruction that specifies data for a single sample of a multi-sample pixel and a sample mask is received and the data for the single sample is stored to each sample of the multi-sample pixel that is enabled according to the sample mask. A multi-sample load instruction that specifies a multi-sample pixel is received, and, in response to executing the multi-sample load instruction, data for one sample of the multi-sample pixel is received. A determination is made that the data for the one sample of the multi-sample pixel represents multi-sample pixel data for at least one additional sample of the multi-sample pixel.

20 Claims, 16 Drawing Sheets

(56) References Cited

U.S. PATENT DOCUMENTS

| | | |
|---|---|---|
| 9,286,659 B2 | 3/2016 | Minkin et al. |
| 2004/0091160 A1* | 5/2004 | Hook et al. .................. 382/239 |
| 2005/0129318 A1 | 6/2005 | Glickman et al. |
| 2006/0103658 A1 | 5/2006 | Liao |
| 2007/0257935 A1* | 11/2007 | Koduri ..................... G06F 3/14 345/611 |
| 2007/0296725 A1 | 12/2007 | Steiner et al. |
| 2009/0091577 A1* | 4/2009 | Brothers ..................... 345/506 |
| 2011/0148919 A1 | 6/2011 | Heggelund et al. |
| 2011/0285742 A1* | 11/2011 | Kilgard et al. ............... 345/589 |
| 2012/0013629 A1* | 1/2012 | Fowler ..................... G06T 9/00 345/531 |
| 2014/0267315 A1 | 9/2014 | Minkin et al. |
| 2014/0267356 A1 | 9/2014 | Minkin et al. |
| 2015/0054836 A1 | 2/2015 | Bolz et al. |

FOREIGN PATENT DOCUMENTS

| | | |
|---|---|---|
| TW | I310541 B | 6/2009 |
| TW | I358046 B | 2/2012 |

OTHER PUBLICATIONS

Office Action from Taiwan Patent Application No. 102144475, dated Mar. 20, 2015.
Non-Final Office Action from U.S. Appl. No. 13/844,147, dated Apr. 9, 2015.
Non-Final Office Action from U.S. Appl. No. 14/010,425, dated May 22, 2015.
Office Action from Taiwan Application No. 102142874, dated Aug. 7, 2015.
Notice of Allowance from U.S. Appl. No. 13/844,095, dated Oct. 14, 2015.
Notice of Allowance from U.S. Appl. No. 13/844,147, dated Oct. 29, 2015.
Final Office Action from U.S. Appl. No. 14/010,425, dated Jun. 29, 2016.
Dffice Action from Chinese Patent Application No. 201310745968.2, dated May 3, 2016.
Dffice Action from Chinese Patent Application No. 201310745828.5, dated Jul. 1, 2016.

* cited by examiner

SYSTEM, METHOD, AND COMPUTER PROGRAM PRODUCT FOR ACCESSING MULTI-SAMPLE SURFACES

CLAIM OF PRIORITY

This application is a continuation of U.S. patent application Ser. No. 13/844,095, filed Mar. 15, 2013, the entire contents of which is incorporated herein by reference.

FIELD OF THE INVENTION

The present invention relates to graphics processing, and more particularly to multi-sample surfaces.

BACKGROUND

When multi-sampling techniques are used to produce anti-aliased images the amount of processing for each pixel may increase as the number of samples per-pixel increases. In addition to increased processing, the amount of bandwidth that is consumed to transfer data between different processing units within a graphics processor also increases. The increases in processing demand and increased bandwidth consumption may result in decreased graphics processing performance and/or increased system cost.

Thus, there is a need for addressing the issues of increased processing and increased bandwidth consumption and/or other issues associated with the prior art.

SUMMARY

A system, method, and computer program product are provided for accessing multi-sample surfaces. A multi-sample store instruction that specifies data for a single sample of a multi-sample pixel and a sample mask is received and the data for the single sample is stored to each sample of the multi-sample pixel that is enabled according to the sample mask. A multi-sample load instruction that specifies a multi-sample pixel is received, and, in response to executing the multi-sample load instruction, data for one sample of the multi-sample pixel is received. A determination is made that the data for the one sample of the multi-sample pixel represents multi-sample pixel data for all samples of the multi-sample pixel or at least one additional sample of the multi-sample pixel.

DETAILED DESCRIPTION

When conventional graphics processors are configured to generate multi-sample surfaces the amount of memory that is allocated to store the multi-sample pixel data increases based on the number of samples that are included in each pixel. As the number of samples per-pixel increases, the bandwidth consumed to read, write, and transmit the multi-sample pixel data also increases.

When the data is the same for each sample of a pixel, a single sample may be stored that represents all of the samples of a multi-sample pixel or all of the samples of a portion of a multi-sample pixel, where the portion includes two or more samples. An encoding state may be associated with the multi-sample pixel that indicates the single sample represents all of the samples, i.e., 1SPP (one sample per-pixel portion). In one embodiment, pixels are grouped into tiles and when all of the multi-sample pixels within the tile may each be represented with a respective single sample, an encoding state of 1SPP may be associated with the entire tile. When the encoding state is 1SPP, the memory footprint for storing the multi-sample pixel data is reduced and the bandwidth consumed to read, write, and transmit the multi-sample pixel data is also reduced. Furthermore, in some cases, a processing unit may be configured to process the single sample to generate processed pixel data for the single sample that represents processed multi-sample pixel data for two or more samples, or even all of the samples of a pixel. Thus, when the encoding state is 1SPP, the processing capacity needed to process a multi-sample pixel may also be reduced.

Figure 1:
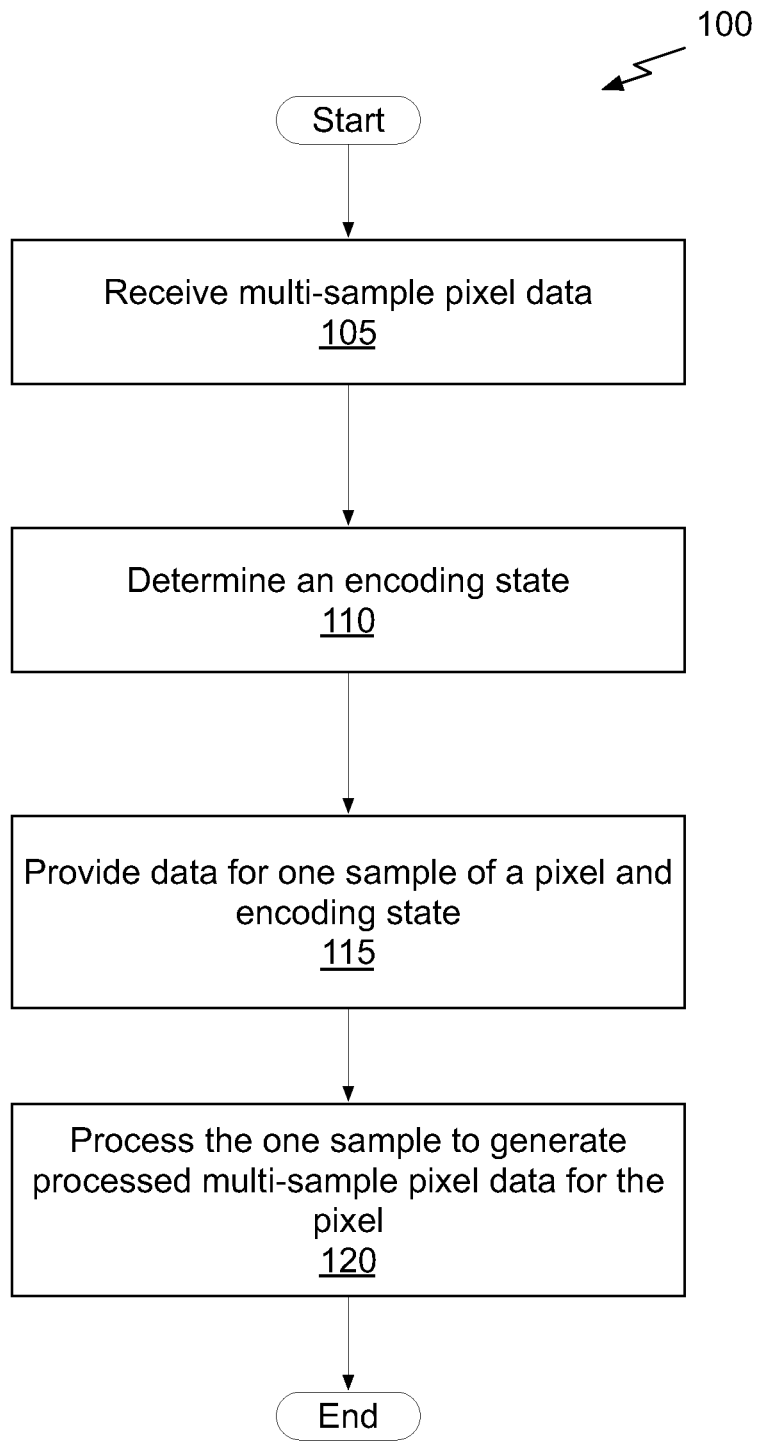
FIG. 1 illustrates a flowchart of a method for processing multi-sample data, in accordance with one embodiment.

FIG. 1 illustrates a flowchart of a method 100 for multi-sample processing, in accordance with one embodiment. At step 105, multi-sample pixel data is received. At step 110, an encoding state associated with the multi-sample pixel data is determined. In one embodiment, the multi-sample pixel data is analyzed to determine the encoding state. In another embodiment, the encoding state is received with the multi-sample pixel data. At step 115, data for one sample of a multi-sample pixel and the encoding state are provided to a processing unit. At step 120, the one sample of the pixel is processed by the processing unit to generate processed data for the one sample. The processed data for the one sample represents processed multi-sample pixel data for all samples or at least a portion of the multi-sample pixel (i.e., all samples of the entire multi-sample pixel or all samples of a portion of the multi-sample pixel).

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
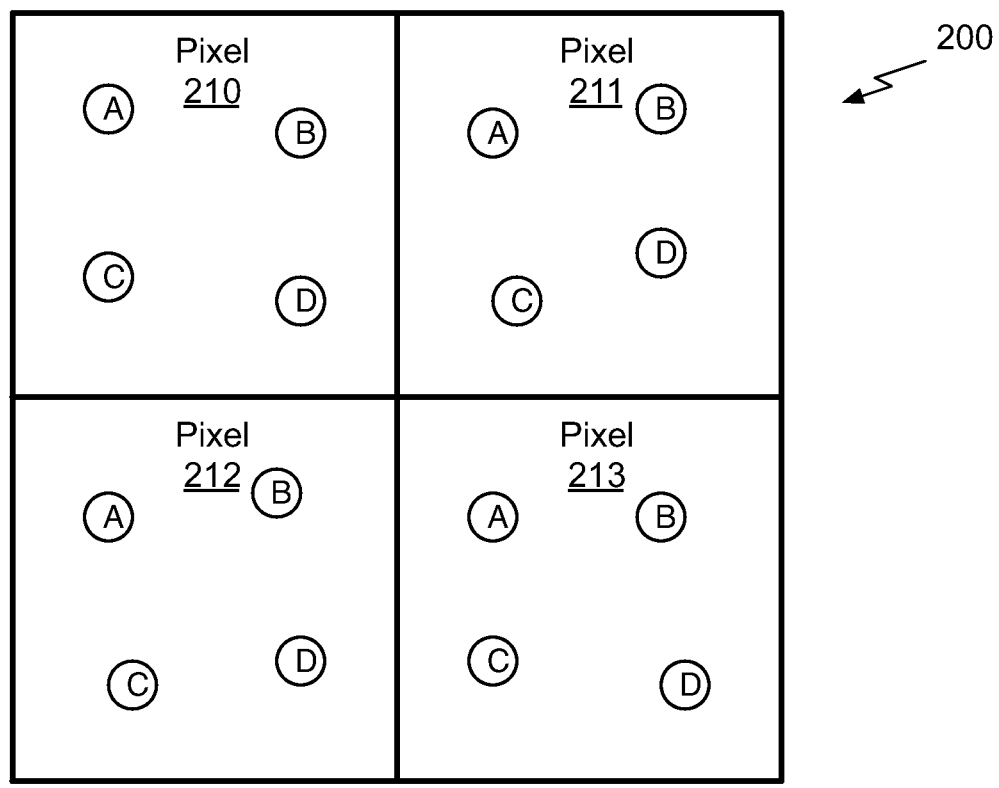
FIG. 2A illustrates a conceptual diagram of sample locations within pixels, in accordance with one embodiment.

FIG. 2A illustrates a conceptual diagram 200 of sample locations within pixels 210, 211, 212, and 213, in accordance with one embodiment. When data is read from a multi-sample surface with 4 samples per-pixel having an encoding state that is not 1SPP, four separate values corresponding to locations A, B, C, and D are stored in the multi-sample surface for each pixel. The multi-sample surface may be a multi-sample z buffer or a multi-sample color buffer. In contrast, when the encoding state of a multi-sample surface is 1SPP, only one value is stored that represents the value for all of the samples (e.g., samples A, B, C, and D).

In addition to the pixel level, the 1SPP encoding state may be applied to tiles of pixels or even an entire surface. A pixel tile may include one or more pixels that are adjacent in screen space or in memory. A size of the tile may be specified in storage units e.g., 256 bytes, rather than as a quantity of pixels. Therefore, the number of pixels in a tile may vary based on the multi-sample mode (i.e., more samples per-pixel results in a smaller tile size). Pixels in the same tile do not necessarily need to be adjacent in screen space. In one embodiment, a pixel tile is sized to correspond to a number of pixels that may be processed in parallel within a multi-threaded graphics core.

As shown in FIG. 2A, the sample locations may be jittered (i.e., distributed) within each pixel to improve the image quality. In one embodiment, a sample location may be positioned at the center of each pixel. Other multi-sample pixel modes may include more than 4 samples or less than four samples for each pixel. The multi-sample data for each sample may include z (depth), color, texture coordinates, or other attributes associated with graphics primitives.

Figure 2B:
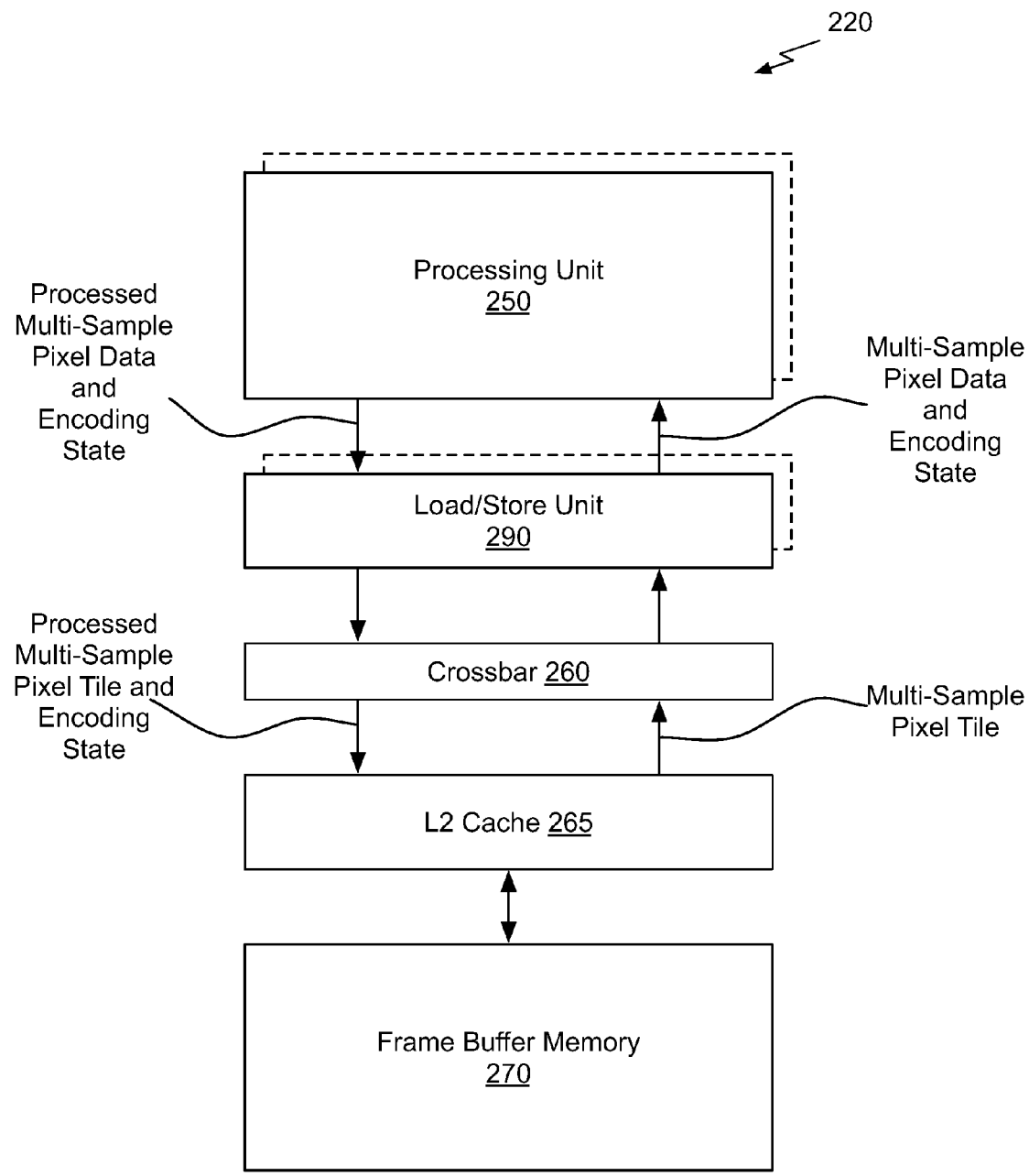
FIG. 2B illustrates a diagram of the various processing units and interconnects that are used during the multi-sample processing, in accordance with one embodiment.

FIG. 2B illustrates a diagram 220 of the various processing units and interconnections that are used during the multi-sample processing, in accordance with one embodiment. An L2 cache 265 is configured to cache data corresponding to a portion of a multi-sample surface, reading and writing a frame buffer memory 270 as needed to satisfy load and store requests that access the multi-sample surface. The L2 cache 265 may be directly coupled to the frame buffer memory 270 or the L2 cache 265 may be indirectly coupled to the frame buffer memory 270 through one or more intervening units, such as a memory controller (not shown).

In one embodiment, the L2 cache 265 stores, or otherwise obtains, the encoding state associated with the mufti-sample surface. In one embodiment, the encoding state may be stored within a memory controller for each page of memory of the frame buffer memory 270. The L2 cache 265 is coupled to a Load/Store unit 290 via a crossbar 260. In one embodiment, the frame buffer memory 270 interfaces with the L2 cache 265 through multiple memory interfaces and the crossbar 260 is configured to route data between the Load/Store unit 290 and multiple L2 caches 265 coupled to different memory interfaces as needed to reach corresponding memory locations in the frame buffer memory 270. FIG. 5 illustrates more details regarding the memory interfaces. Multiple Load/Store units 290 may be coupled between the crossbar 260 and multiple processing units 250 that are configured to process pixel data.

Rather than being configured to replicate sample data for all of the samples in a mufti-sample pixel when the encoding state is 1SPP to provide mufti-sample pixel data to the Load/Store unit 290, the L2 cache 265 may be configured to provide the multi-sample pixel data with only one sample and the encoding state of 1SPP to the Load/Store unit 290 via the crossbar 260. Transmitting less data per-pixel over the crossbar 260 consumes less bandwidth. Because less data is transferred across the crossbar 260, less power is also consumed. Therefore, it is desirable to transmit the multi-sample pixel data using the encoding state of 1SPP. In one embodiment, the L2 cache 265 may be configured to transmit the multi-sample pixel data in tile-sized increments (1SPP format or not) to the Load/Store unit 290 via the crossbar 260. Accordingly, the Load/Store unit 290 may be configured to store multi-sample pixel data in tile-sized increments. In other embodiments, the L2 cache 265 is configured to transmit a subset of the samples for a multi-sample pixel based on a request received from the Load/Store unit 290.

The Load/Store unit 290 is configured to provide multi-sample pixel data to the processing unit 250 when a load request is received from the processing unit 250. The Load/Store unit 290 is also configured to receive processed multi-sample pixel data from the processing unit 250 and store the multi-sample pixel data. The Load/Store unit 290 may include a buffer for storing the processed multi-sample data temporarily before outputting the processed multi-sample data to the frame buffer memory 270 via the crossbar 260 and L2 cache 265. In one embodiment, the Load/Store unit 290 functions, at least in part, as a cache that is configured to buffer multi-sample pixel data received from the L2 cache 265 and processed multi-sample pixel data received from the processing unit 250 in a single buffer. When an entry is not available in the buffer to store multi-sample pixel data or processed multi-sample pixel data, one or more entries are written back to the frame buffer memory 270 (i.e., flushed) via the crossbar 260 and the L2 cache 265. When an entry has not been written with processed multi-sample pixel data received from the processing unit 250, the entry may be replaced and not flushed to the L2 cache 265. Details of the Load/Store unit 290 are described in conjunction with FIG. 2C.

The Load/Store unit 290 receives the multi-sample pixel data and determines the encoding state associated with the multi-sample pixel data. When the encoding state is 1SPP, data for one sample of a multi-sample pixel and the encoding state are provided to the processing unit 250. When the encoding state is not 1SPP, the Load/Store unit 290 may be configured to provide data for all samples or at least a portion of the multi-sample pixel to the processing unit 250 along with the encoding state.

In one embodiment, the processing unit 250 may be configured to load a single sample of a multi-sample pixel instead of all samples of a multi-sample pixel, and, if the single sample is returned and the encoding state for the single sample is 1SPP, the processing unit 250 processes the single sample. If the single sample is returned and the encoding state for the single sample is not 1SPP, the processing unit 250 then loads the remaining samples of the multi-sample pixel and processes all of the samples of the multi-sample pixel. By deferring loading of the remaining samples, the bandwidth consumed to transfer the multi-sample pixel data is reduced when the encoding state is 1SPP and the remaining samples are not loaded. In another embodiment, if the single sample is returned and the encoding state for the single sample is not 1SPP, the processing unit 250 issues aloud request for one or more additional samples.

A multi-sample load instruction that includes a mask corresponding to samples of the multi-sample pixel may be used to load a single sample of a multi-sample pixel or to load one or more additional samples of the multi-sample pixel. In one embodiment, the multi-sample load instruction specifies an index corresponding to a sample to request the sample or a sequence of samples. When executed, the multi-sample load instruction may be configured to return the multi-sample pixel data corresponding to the sample and a mask indicating other samples in the multi-sample pixel that have the same multi-sample pixel data and/or the encoding state of the multi-sample pixel.

When the encoding state is 1SPP, the one sample of the multi-sample pixel is processed by the processing unit 250 to generate processed data for the one sample that represents processed multi-sample pixel data for all samples or at least a portion of the multi-sample pixel. When the encoding state is not 1SPP, all of the samples of the multi-sample pixel portion are processed to generate processed data for all of the samples. Therefore, when the number of samples per-pixel is 8, the amount of processing per-pixel is 8× when the encoding state is not 1SPP compared with when the encoding state is 1SPP. The processing is proportionally reduced for other numbers of samples per-pixel when the encoding state is 1SPP. Reducing the multi-sample pixel processing may improve performance and may also reduce power consumption. As described in conjunction with FIGS. 5A, 5B, 5C, 6A, and 6B, in other embodiments, the processing unit 250 may be configured to process a subset of the samples and the processing unit 250 provides information (e.g., a per-pixel sample mask or per-pixel portion sample mask) indicating which samples are represented by the processed multi-sample data that is output to the Load/Store unit 290.

When the processing unit 250 is configured to perform a blending operation or a fragment shading operation, the multi-sample pixel is considered a destination pixel that is combined with source pixel data to produce the processed data for the multi-sample pixel. It is not unusual for the source pixel data to have the same value for all samples of a multi-sample pixel, such that the blending or shading operation generates processed data for a single sample that represents all samples of the processed multi-sample pixel. In this case, the processing unit 250 provides the processed data for the single sample in a store request to the Load/Store Unit 290 along with the encoding state of 1SPP. Otherwise, when processed data is generated for all of the samples, the processing unit 250 provides the processed data for all of the samples in a store request to the Load/Store Unit 290 along with the encoding state of not 1SPP. A multi-sample store instruction that includes a mask corresponding to samples of the multi-sample pixel may be used to store a value to one or more samples of a multi-sample pixel.

Efficiencies can be realized in transmitting less data for each multi-sample pixel and in processing of the data by providing the encoding state with the data for the multi-sample pixels. The amount of bandwidth that is consumed transmitting the data across the crossbar 260 may be reduced for load operations and/or store operations. A single processing thread may be allocated by the processing unit 250 to generate the data for a multi-sample pixel having the encoding state of 1SPP compared with allocating multiple threads to generate the data for a multi-sample pixel having the encoding state that is not 1SPP. In one embodiment, the Load/Store unit 290 may be configured to coalesce the data for the multi-sample pixels received from the processing unit 250 into a tile before transmitting the data over the crossbar 260 to the L2 cache 265. When an entire tile of data is transmitted to the L2 cache 265, the Load/Store unit 290 may provide the encoding state for the entire tile rather than for individual multi-sample pixels.

Figure 2C:
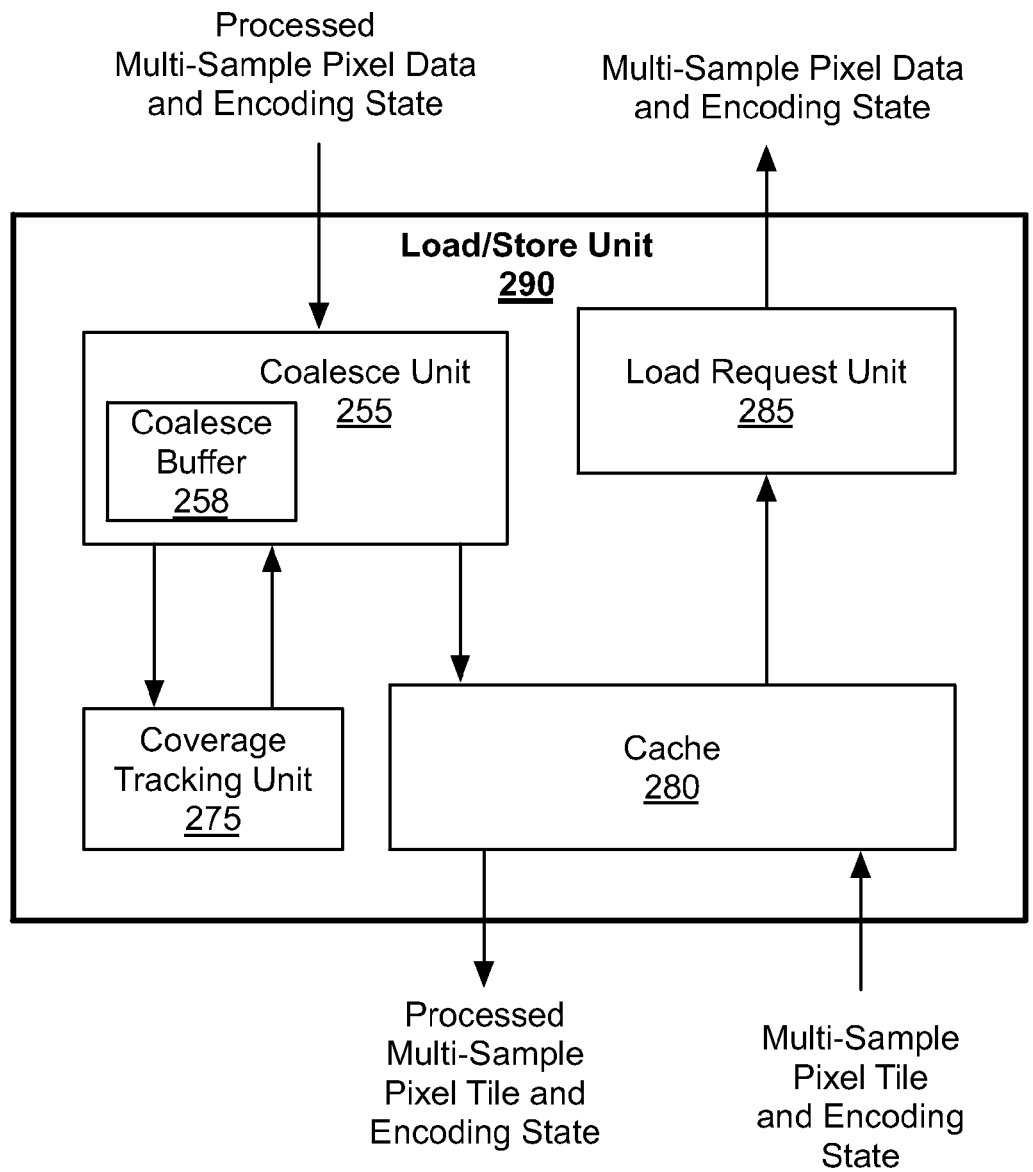
FIG. 2C illustrates a diagram of a processing unit shown in FIG. 2B, in accordance with one embodiment.

FIG. 2C illustrates a diagram of the Load/Store unit 290 shown in FIG. 2B, in accordance with one embodiment. As shown in FIG. 2C, in one embodiment the Load/Store unit 290 comprises a cache 280, a load request unit 285, a coalesce unit 255, and a coverage tracking unit 275. The cache 280 receives data for one or more multi-sample pixels and stores the data in cache entries. The data may correspond to a tile including two or more multi-sample pixels. The cache 280 may also store the encoding state associated with the data (for each tile or each multi-sample pixel). In one embodiment, the cache 280 may also store other information associated with the data, such as the number of samples per-pixel (multi-sample mode) and/or per-pixel sample masks. The load request unit 285 is configured to determine the encoding state for the data that is returned to the processing unit 250 in response to a load request.

In one embodiment, the encoding state is received with the data from the L2 cache 265 and the load request unit 285 provides the encoding state to the processing unit 250 along with the data. In another embodiment, the load request unit 285 does not receive encoding state from the L2 cache 265 and the load request unit 285 is configured to compare the values of data for different samples of a multi-sample pixel or a portion of the multi-sample pixel and determine the encoding state to be 1SPP when all of the samples of a multi-sample pixel have the same value. Otherwise the load request unit 285 determines that the encoding state is not 1SPP. In one embodiment, the L2 cache 265 is configured to compare the values of data for different samples of a multi-sample pixel or a portion of the multi-sample pixel and determine the encoding state for each pixel or for a tile of pixels in order to provide the encoding state to the Load/Store unit 290. As described in conjunction with FIGS. 5A, 5B, 5C, 6A, and 6B, in other embodiments, the L2 cache 265 and/or the Load/Store unit 290 may be configured to compare the values of data for different samples of a multi-sample pixel or portion of a multi-sample pixel and provide information (e.g., a per-pixel sample mask or per-pixel portion sample mask) indicating which samples are represented by the processed multi-sample data that is output to the Load/Store unit 290 or the processing unit 250, respectively.

Depending on the multi-sample mode (i.e., the number of samples used for a multi-sample pixel), the load request unit 285 may be configured to generate the encoding state for a partial multi-sample pixel (i.e., portion of a multi-sample pixel). For example, when a cache line of the cache 280 is 32 bytes and a multi-sample surface stores 16 samples of 4 bytes each for each multi-sample pixel, the load request unit 285 may be configured to compare 8 different samples of the multi-sample pixel and determine an encoding state for the 8 samples. Thus, each 16 sample multi-sample pixel may have two encoding states, one encoding state for each portion of samples. On the other hand, when a multi-sample surface stores 4 samples of 4 bytes each for each multi-sample pixel, the load request unit 285 may be configured to compare 4 different samples for 2 different multi-sample pixels and determine one encoding state for the two different multi-sample pixels. Thus, the granularity of the encoding state may vary according to the number of comparisons made by the load request unit 285 and/or the size of a cache line.

The coalesce unit 255 receives processed data for multi-sample pixels and encoding state corresponding to the multi-sample pixels from the processing unit 250. The coalesce unit 255 may include a coalesce buffer 258 into which the processed data is stored. The coalesce buffer 258 may be configured to store processed data for one or more tiles, or even for a partial tile when the amount of storage needed in the coalesce buffer 258 is not large enough to store the processed data for an entire tile. When the coalesce buffer 258 stores more than one tile, the coverage tracking unit 275 is configured to track coverage for each tile. Furthermore, when the multi-sample mode may be different for each tile, the coalesce unit 255 stores information indicating the multi-sample mode for each tile. When entries in the coalesce buffer 258 are written a corresponding cache line or portion of a cache line in the cache 280 may be invalidated.

In one embodiment, the coalesce buffer 258 is omitted and the processed data is stored in the cache 280. In other words, the coalesce buffer 258 is embodied as the entries within the cache 280 that store data for the processed pixels. When the encoding state received from the processing unit 250 is 1SPP, all of the samples of the multi-sample pixel or a portion of the multi-sample pixel have the same values. The 1SPP encoding state may be used for a portion of a multi-sample pixel when the number of samples is high. For example, when the number of bytes needed to store the data for all of the samples in a multi-sample pixel is greater than 256 Bytes or the size of a cache line.

In one embodiment, the coverage tracking unit 275 stores a single bit for each multi-sample pixel, and the bit is set when a store request is received by the Load/Store unit 290 for the multi-sample pixel. When all of the bits for the multi-sample pixels of a tile are set, store requests have been received for all for the multi-sample pixels in the tile and the tile is "full". In another embodiment, the coverage tracking unit 275 uses a counter to track the number of store operations for a tile to determine if store requests have been received for all of the multi-sample pixels in the tile. When a tile is "full", the data for the tile may be flushed from the coalesce buffer 258 or the cache 280 to the L2 cache 265. Entries in the cache 280 storing the data for the tile may be marked as empty and the bits in the coverage tracking unit 275 corresponding to the tile may be cleared when the tile is flushed.

When the coalesce buffer 258 is configured to store a partial tile, processed data for the partial tile may be flushed when the coverage tracking unit 275 indicates that store operations have been received for all of the multi-sample pixels in the partial tile. Entries in the cache 280 storing the data for the partial tile may be marked as empty and the bits in the coverage tracking unit 275 corresponding to the partial tile may be cleared when the partial tile is flushed. An advantage of storing processed data for groups of multi-sample pixels is that a single encoding state may be output to the L2 cache 265 for the entire group, e.g., tile, rather than outputting an encoding state for each multi-sample pixel.

Under certain conditions a tile may be flushed by the coalesce unit 255 before processed data for all of the multi-sample pixels in the tile are received from the processing unit 250 or when the tile is not "full". A first condition is that processed data is received for a "new" tile and storage is not available in the coalesce buffer 258 to coalesce a new tile. The second condition is that the processed data is for a multi-sample pixel that has already been received for a tile being coalesced (i.e., the bit associated with the multi-sample pixel is set in the coverage tracking unit 275). The coalesce unit 255 may flush the processed data that is already stored for the tile to begin coalescing the tile again with the new processed data. Alternatively, the coalesce unit 255 may compare the new processed data with the processed data stored in the coalesce buffer 258 and, if the new processed data equals the stored processed data, the coalesce unit 255 may discard the new processed data (or overwrite the stored processed data with the new processed data) and avoid flushing the tile. When the new processed data does not match the stored processed data, the coalesce unit 255 flushes the tile to begin coalescing the tile again with the new processed data. Alternatively, the coalesce unit 255 may flush one or more entries in the coalesce buffer 258 that is occupied by the stored processed data and store the new processed data in the one or more entries.

When an incomplete tile (i.e., a tile that is not "full") is flushed, the load/store unit 290 outputs the processed data for the multi-sample pixels that have been received from the processing unit 250. The tile coverage information maintained in the tracking unit 275 may be used by the coalesce unit 255 to determine which multi-sample pixels are flushed. When the processed data is stored in the cache 280 (i.e., the coalesce buffer 258 is omitted), the processed pixel data may be flushed when a cache miss occurs. In one embodiment, the processing unit 250 is configured to process the data for samples that are within one tile in parallel to enable the load/store unit 290 to coalesce the sample into tiles that may be flushed to the L2 cache 265 as "full" tiles.

The processed data for the multi-sample pixels that is flushed may all have the same encoding state or an encoding state may be stored in the coalesce buffer 258 for each multi-sample pixel. The processed data for the incomplete tile may be output with a single encoding state or with an encoding state for each multi-sample pixel (per-pixel encoding state) or portion of a multi-sample pixel. When all of the multi-sample pixels have the same encoding state, the processed data may be output with a tile mask indicating which of the multi-sample pixels are included in the flush. When encoding state is maintained for each multi-sample pixel, the coalesce unit 255 may be configured to examine the per-pixel encoding state for the tile. When all of the per-pixel encoding state is the same, the processed data may be output with a tile mask indicating which of the multi-sample pixels are included in the flush.

When the per-pixel encoding state differs for at least one multi-sample pixel, the processed data associated with a 1SPP encoding state may be replicated for each sample in the respective multi-sample pixel and all of the processed data may be output with a tile mask and an encoding state of not 1SPP. Alternatively, the processed data may be output in two sub-flushes. A first sub-flush may include the processed data associated with the encoding state of 1SPP and a corresponding first tile mask. A second sub-flush may include the processed data associated with the encoding state of not 1SPP and a corresponding second tile mask. Finally, the processed data may be output with per-pixel encoding state and a tile mask.

Figure 2D:
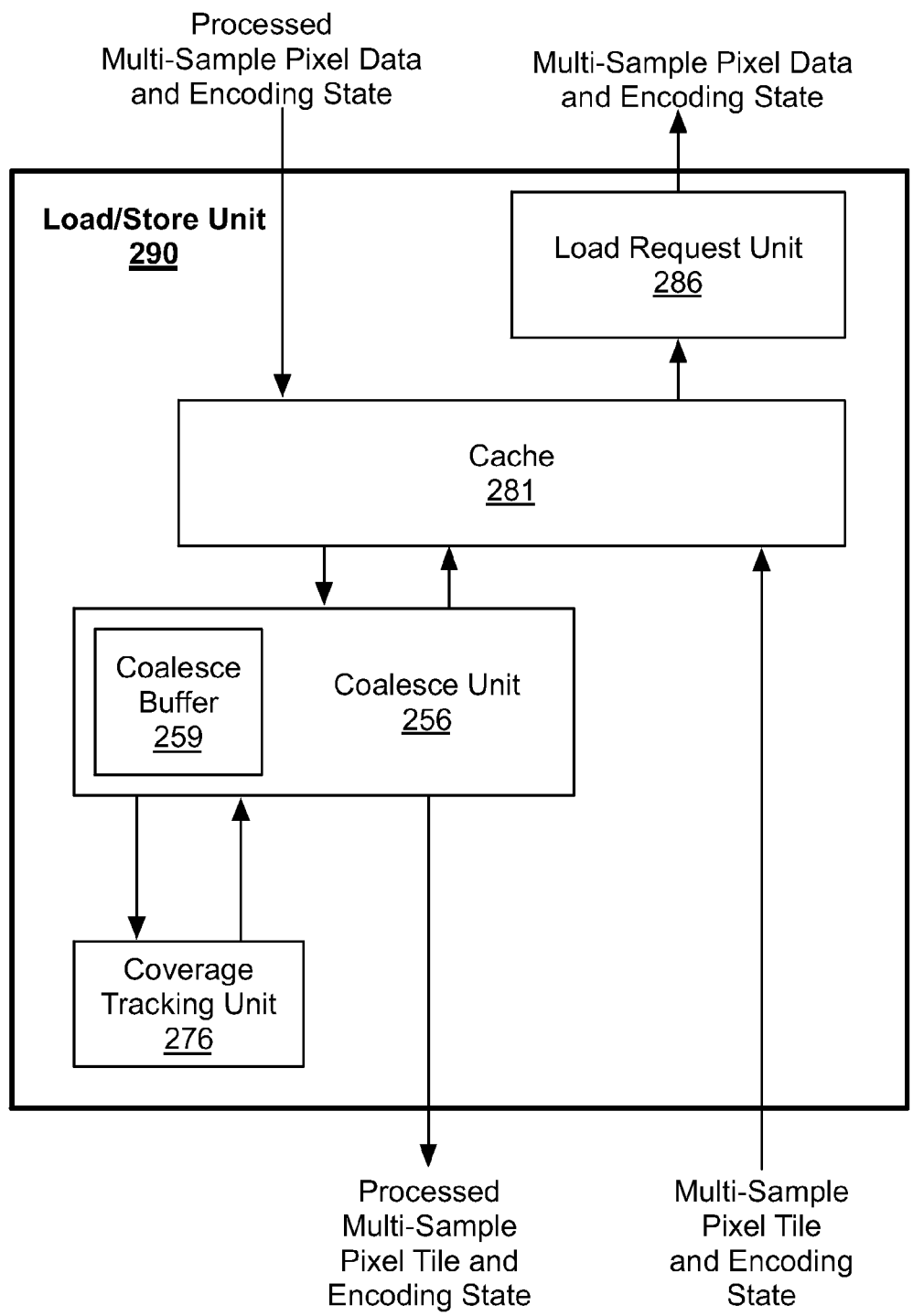
FIG. 2D illustrates another diagram of the Load/Store unit shown in FIG. 2B, in accordance with one embodiment.

FIG. 2D illustrates another diagram of the Load/Store unit 290 shown in FIG. 2B, in accordance with one embodiment. As shown in FIG. 2D, in one embodiment the Load/Store unit 290 comprises a cache 281, a load request unit 286, a coalesce unit 256, and a coverage tracking unit 276. The load request unit 286 and the coverage tracking unit 276 perform substantially the same functions as the previously described load request unit 285 and coverage tracking unit 275. The cache 281 performs substantially the same functions as the previously described cache 280. However, the cache 281 is configured to receive the processed multi-sample pixel data from the processing unit 250. In one embodiment, when the processed multi-sample pixel data that is received from the processing unit 250 has an encoded state of 1SPP, the processed multi-sample pixel data is replicated for all of the samples in the multi-sample pixel or portion of the multi-sample pixel and stored in the cache 281. When configured to operate in this manner, the encoding state does not need to be stored in the cache 281.

In one embodiment, the coalesce unit 256 is configured to snoop the writes to the cache 281 that are received from the processing unit 250 and update the tile coverage mask maintained by the coverage tracking unit 276. When a tile is "full" the coalesce unit 256 reads the tile data from the cache 281. Entries in the cache 281 storing the data for the tile may be marked as empty and the bits in the coverage tracking unit 276 corresponding to the tile may be cleared when the tile is flushed.

In one embodiment, when the encoding state for the processed data that is flushed is not 1SPP, the coalesce unit 256 is configured to analyze the processed data. The coalesce unit is configured to compare the values of the processed data for different samples of each mufti-sample pixel or a portion of each mufti-sample pixel and determine the encoding state for each pixel or for a tile of pixels in order to provide the encoding state to the L2 cache 265. The coalesce buffer 259 may be configured to store the processed data for different samples while the analysis is performed. The coalesce buffer 259 may also be configured to store the encoding state for each multi-sample pixel or portion of each multi-sample pixel as the processed data is analyzed.

When the coalesce buffer 259 is configured to output a partial tile, processed data for the partial tile may be flushed when the coverage tracking unit 276 indicates that store operations have been received for all of the multi-sample pixels in the partial tile. Entries in the cache 281 storing the data for the partial tile may be marked as empty and the bits in the coverage tracking unit 276 corresponding to the partial tile may be cleared when the partial tile is flushed.

Under certain conditions a tile may be flushed by the coalesce unit 255 before processed data for all of the multi-sample pixels in the tile are received from the processing unit 250 or when the tile is not "full". A first condition is that processed data is received for a "new" tile and storage is not available in the cache 281 to coalesce a new tile. The second condition is that the processed data is for a multi-sample pixel that has already been received for a tile being coalesced (i.e., the bit associated with the multi-sample pixel is set in the coverage tracking unit 275). The coalesce unit 256 may flush the processed data that is already stored for the tile to begin coalescing the tile again with the new processed data. Alternatively, the coalesce unit 256 may flush one or more entries in the cache 281 that are occupied by the stored processed data and store the new processed data in the one or more entries.

When an incomplete tile (i.e., a tile that is not "full") is flushed, the load/store unit 290 outputs the processed data for the multi-sample pixels that have been received from the processing unit 250. The tile coverage information maintained in the tracking unit 276 may be used by the coalesce unit 256 to determine which multi-sample pixels are flushed. The processed pixel data may be flushed when a cache miss occurs for the cache 281. In one embodiment, the processing unit 250 is configured to process the data for samples that are within one tile in parallel to enable the load/store unit 290 to coalesce the sample into tiles that may be flushed to the L2 cache 265 as "full" tiles.

The processed data for the multi-sample pixels that is flushed may all have the same encoding state or an encoding state may be stored in the coalesce buffer 259 or the cache 281 for each multi-sample pixel. The processed data for the incomplete tile may be output with a single encoding state or with an encoding state for each multi-sample pixel (per-pixel encoding state) or portion of a multi-sample pixel. When all of the multi-sample pixels have the same encoding state, the processed data may be output with a tile mask indicating which of the multi-sample pixels are included in the flush. When encoding state is maintained for each multi-sample pixel, the coalesce unit 256 may be configured to examine the per-pixel encoding state for the tile. When all of the per-pixel encoding state is the same, the processed data may be output with a tile mask indicating which of the multi-sample pixels are included in the flush.

When the per-pixel encoding state differs for at least one multi-sample pixel, the processed data associated with a 1SPP encoding state may be replicated for each sample in the respective multi-sample pixel and all of the processed data may be output with a tile mask and an encoding state of not 1SPP. Alternatively, the processed data may be output in two sub-flushes. A first sub-flush may include the processed data associated with the encoding state of 1SPP and a corresponding first tile mask. A second sub-flush may include the processed data associated with the encoding state of not 1SPP and a corresponding second tile mask. Finally, the processed data may be output with per-pixel encoding state and a tile mask.

Figure 3:
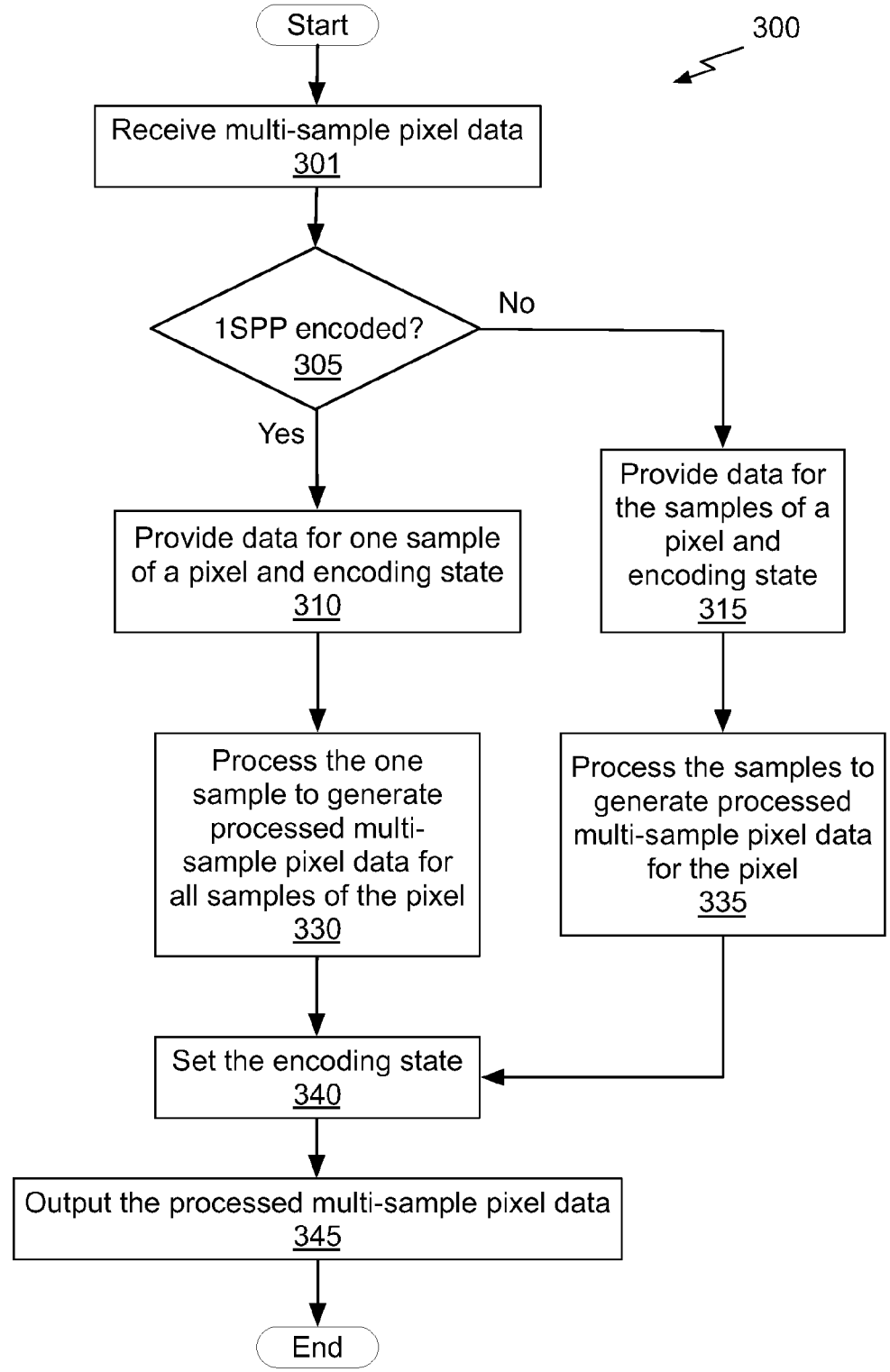
FIG. 3 illustrates another flowchart of a method for processing multi-sample data, in accordance with one embodiment.

FIG. 3 illustrates another flowchart of a method 300 for processing multi-sample data, in accordance with one embodiment. The steps shown in method 300 may be performed by a shader program that is executed by a graphics processor. At step 301, the load/store unit 290 receives multi-sample pixel data. At step 305, the load/store unit 290 determines if the encoding state associated with the multi-sample pixel data is 1SPP, and, if so, at step 310, the load/store unit 290 provides data for one sample of each multi-sample pixel or portion of a multi-sample pixel and the encoding state of 1SPP to the processing unit 250.

In one embodiment, the load/store unit 290 receives encoding state for the multi-sample pixels with the multi-sample pixel data. In another embodiment, as described in further detail in conjunction with FIG. 4B, the load/store unit 290 is configured to perform an analysis of the multi-sample pixel data to determine if the multi-sample pixel data may be encoded in 1SPP format. At step 305, when the load/store unit 290 determines that the multi-sample pixel data may be encoded in 1SPP format by analyzing the multi-sample pixel data, the encoding state is set to 1SPP. At step 330, the one sample of the pixel is processed by the processing unit 250 to generate processed data for the all samples of the pixel.

If at step 305, the load/store unit 290 determines that the encoding state associated with the multi-sample pixel data is not 1SPP, then at step 315, the load/store unit 290 may provide data for all samples of each multi-sample pixel or each multi-sample pixel portion and the encoding state to the processing unit 250. At step 315, the encoding state is set to not 1SPP and is output to the processing unit 250 along with the data for all samples of each multi-sample pixel or each multi-sample pixel portion. At step 335, the processing unit 250 processes the data for an of the samples for each multi-sample pixel or each multi-sample pixel portion.

At step 340, the processing unit 250 sets the encoding state to 1SPP or not 1SPP based on the representation of the processed data. At step 345, the processing unit 250 outputs the processed data for each multi-sample pixel or each multi-sample pixel portion to the Load/Store unit 290 along with the encoding state. The processed data may include data for the one sample or for all samples of a multi-sample pixel or for all samples of a multi-sample pixel portion.

Figure 4A:
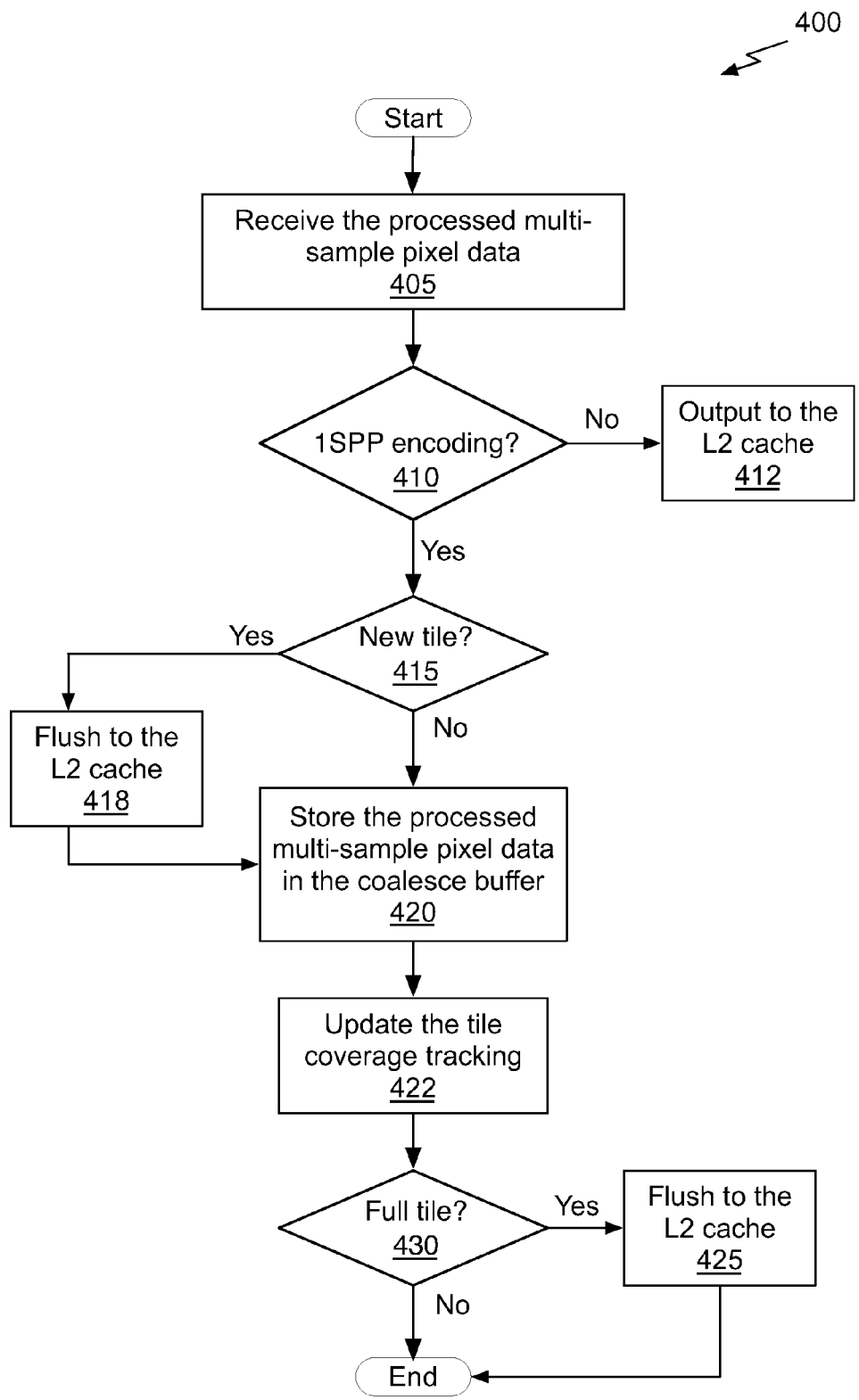
FIG. 4A illustrates a flowchart of a method for coalescing processing multi-sample data, in accordance with one embodiment.

FIG. 4A illustrates a flowchart of a method 400 for coalescing processing multi-sample data, in accordance with one embodiment. Although the steps shown in FIG. 4A are described as being performed by the Load/Store unit 290, one or more of the Load/Store unit 290, the L2 cache 265, or the processing unit 250 may be configured to perform the steps shown in FIG. 4A. The steps are described in the context of the Load/Store unit 290 shown in FIG. 2C. The steps may also be performed by the Load/Store unit 290 shown in FIG. 2D, with the cache 281 storing the processed data instead of the coalesce buffer 258.

At step 405, the Load/Store unit 290 receives the processed data for a multi-sample pixel from the processing unit 250. At step 410, the Load/Store unit 290 examines the encoding state that is provided by the processing unit 250 with the processed data and determines if the encoding state is 1SPP. When the encoding state is not 1SPP, the Load/Store unit 290 outputs the processed data to the L2 cache 265 at step 412. In another embodiment, when the encoding state is not 1SPP, the Load/Store unit 290 stores the processed data for all of the samples in the coalesce buffer 258. When an entire tile is flushed from the coalesce buffer 258, the Load/Store unit 290 then analyzes the processed data to determine if the processed data for the entire tile may be represented using only one sample for each multi-sample pixel. The technique described in conjunction with FIG. 4B may be applied to perform the analysis.

If, at step 410, the encoding state is 1SPP, at step 415, the Load/Store unit 290 determines if a new tile is needed to store the processed data because the multi-sample pixel is not within a current tile that is stored in the coalesce buffer 258, and, if not, the Load/Store unit 290 proceeds to step 420. If, a new tile is needed, at step 418, the processed data for the current tile is flushed to the L2 cache 265 and the tile coverage is cleared in the coverage tracking unit 275 before the Load/Store unit 290 proceeds to step 420. If, at step 415, a new tile is not needed to store the processed data, then at step 420, the Load/Store unit 290 stores the processed data for the multi-sample pixel in the coalesce buffer 258. At step 422, the Load/Store unit 290 updates the tile coverage stored in the coverage tracking unit 275 and the Load/Store unit 290 proceeds to step 430.

At step 430, the Load/Store unit 290 determines if a tile stored in the coalesce buffer 258 is fully covered, and, if so, the processed data for the fully covered tile is flushed to the L2 cache 265 and the tile coverage is cleared in the coverage tracking unit 275 and the Load/Store unit 290 terminates handling of the process multi-sample pixel data that was received at step 405. The steps described in conjunction with FIG. 4A may also be performed for a partial tile when the coalesce buffer 258 is configured to store a partial tile instead of an entire tile.

Figure 4B:
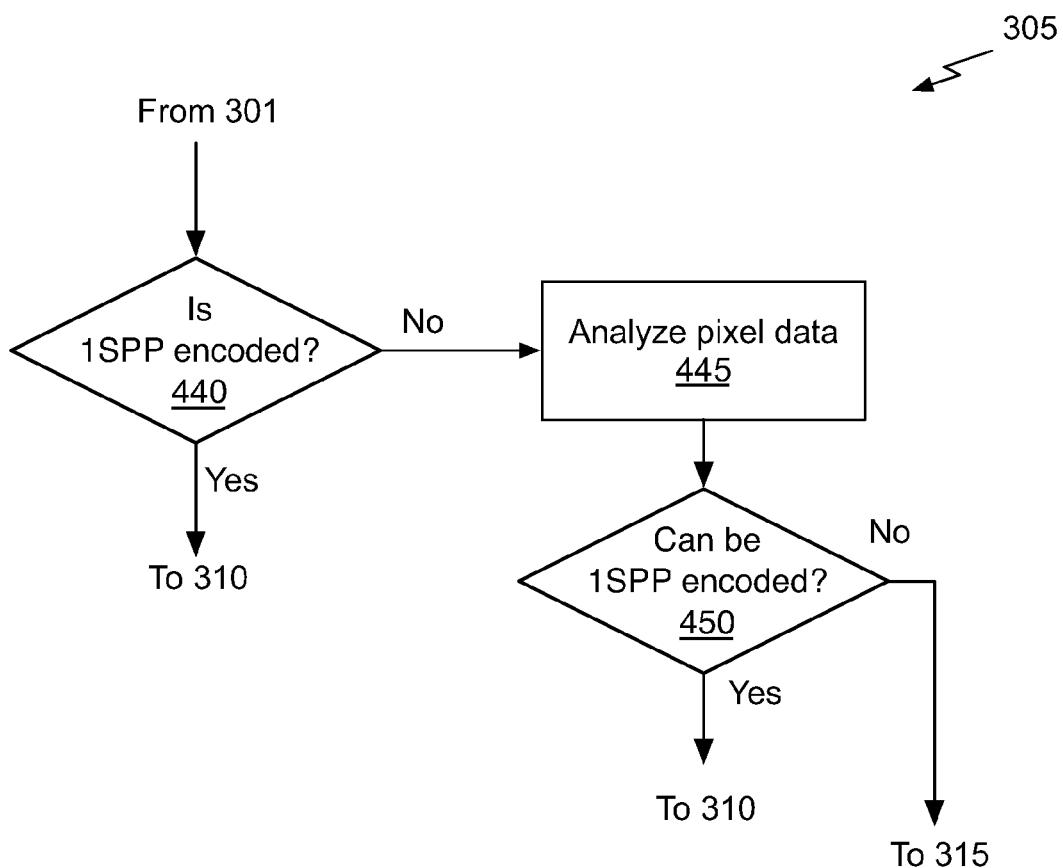
FIG. 4B illustrates a flowchart of a method for performing a step of the method shown in FIG. 3, in accordance with one embodiment.

FIG. 4B illustrates a flowchart of a method for performing the step 305 of the method 300 shown in FIG. 3, in accordance with one embodiment. Although the steps shown in FIG. 4B are described as being performed by the Load/Store unit 290, one or more of the Load/Store unit 290, the L2 cache 265, or the processing unit 250 may be configured to perform the steps shown in FIG. 4B.

At step 440, the Load/Store unit 290 determines if an encoding state of 1SPP was received with the multi-sample pixel data, and, if so, the Load/Store unit 290 proceeds to step 310. Otherwise, at step 445, the Loud/Store unit 290 analyzes the multi-sample pixel data to determine if the multi-sample pixel data may be encoded in 1SPP format. In one embodiment, the Load/Store unit 290 compares values for all samples of each multi-sample pixel or portion of a multi-sample pixel to determine if a tile of pixel data received from the L2 cache 265 can each be represented by single sample before storing the pixel data in the cache 280. In another embodiment, the Load/Store unit 290 compares values for all samples of each multi-sample pixel that is read from the cache 280 for output to the processing unit 250 to determine if the data can each be represented by single sample before outputting the pixel data to the processing unit 250. If, at step 450, the Load/Store unit 290 determines that the multi-sample pixel data may be encoded in 1SPP format, then, the Load/Store unit 290 proceeds to step 310. Otherwise, Load/Store unit 290 proceeds to step 315.

When the data is the same for each sample of a pixel, the 1SPP encoding state may be used to reduce the memory footprint for storing the multi-sample pixel data and also reduce the bandwidth consumed to read, write, and transmit the multi-sample pixel data. Furthermore, in some cases, a processing unit, such as the processing unit 250, may be configured to process the single sample to generate processed multi-sample pixel data for the single sample that represents processed multi-sample pixel data for two or more samples, or even all of the samples of a multi-sample pixel.

Multi-Sample Surface Processing Using Sample Subsets

In addition to an encoding state of 1SPP and not 1SPP, an encoding state may be provided or determined that allows sample subsets for a multi-sample pixel to have the same data values, but does not require all samples in a multi-sample pixel to have the same data values. Such an encoding state is referred to as a subset encoding state. In other words, when the encoding state is subset, data for single sample may be stored that represents multi-sample pixel data for all samples in a subset of a multi-sample pixel that includes the single sample. The multi-sample pixel data is analyzed to identify subsets of samples of a multi-sample pixel that have equal data when the subset encoding state may be used.

Each subset includes at least one sample and the encoding state of subset indicates which samples are included in a subset for a multi-sample pixel. For example, the subset encoding state may include a per-pixel sample mask indicating the samples of the multi-sample pixel that are included in the subset. Typically, the subset encoding state is relevant for individual multi-sample pixels. However, the encoding state of subset may also be used for an entire tile or partial tile of multi-sample pixel data.

Figure 5A:
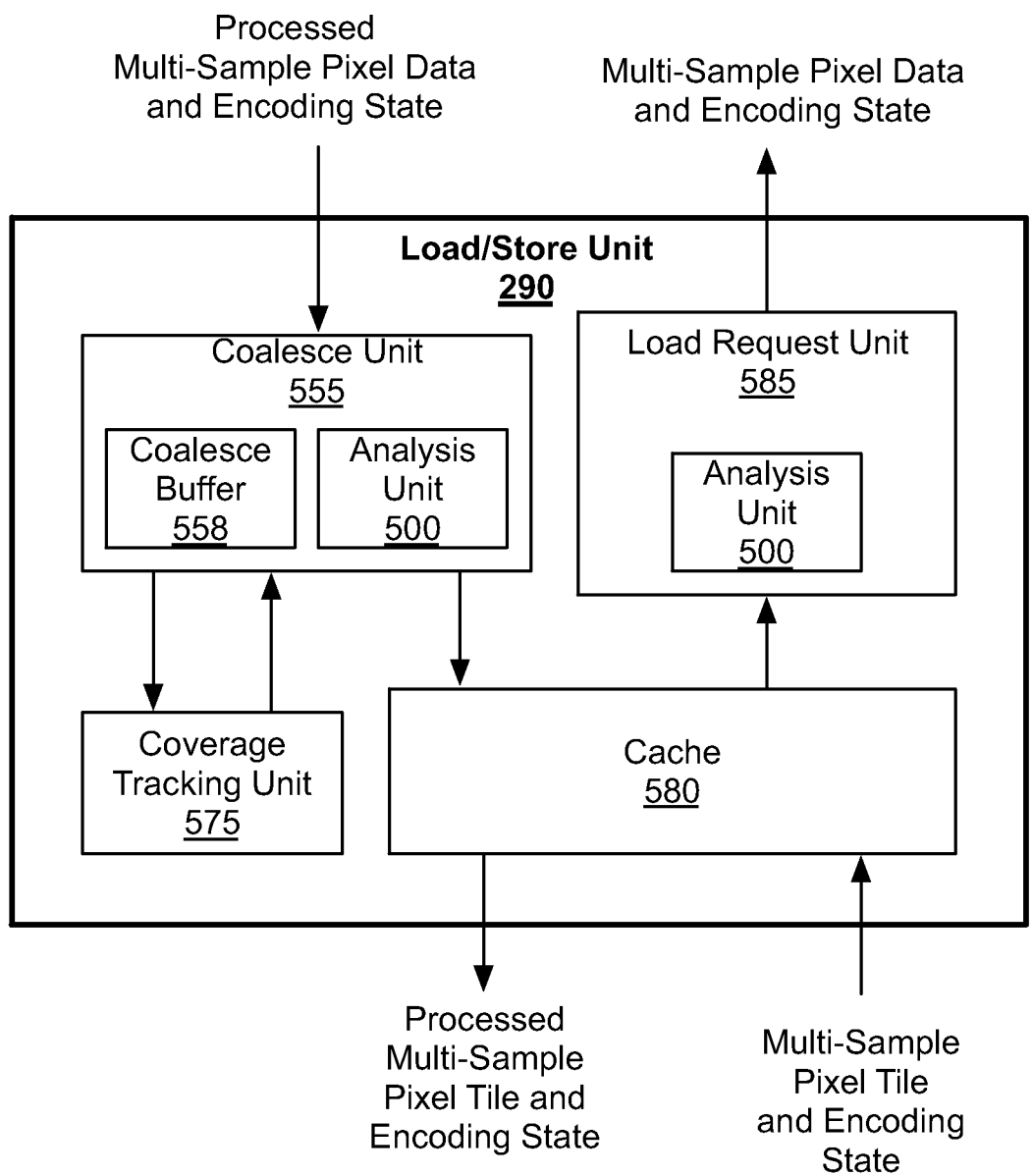
FIG. 5A illustrates another diagram of a processing unit shown in FIG. 2B, in accordance with one embodiment.

FIG. 5A illustrates another diagram of the Load/Store unit 290 shown in FIG. 2B, in accordance with one embodiment. As shown in FIG. 5A, in one embodiment the Load/Store unit 290 comprises a cache 580, a load request unit 585, a coalesce unit 555, and a coverage tracking unit 575. The cache 580 performs substantially the same functions as the previously described cache 280, except that any encoding state stored in the cache may also include per-pixel sample masks for the subset encoding state.

The load request unit 585 performs at least the functions of the previously described load request unit 285. The load request unit 585 also includes an analysis unit 500 that may be configured to analyze the multi-sample pixel data to determine if the multi-sample pixel data may be encoded in 1SPP format, as previously described. Additionally, the analysis unit 500 may be configured to analyze the multi-sample pixel data to determine if the multi-sample pixel data may be encoded with an encoding state of subset. More specifically, the analysis unit 500 may generate a per-pixel sample mask for each sample subset, where all of the samples in a subset can be represented by a single sample of the subset, i.e., the samples in the subset have the same data. The analysis unit 500 may determine the encoding state that is output to the processing unit 250. In one embodiment, the encoding state is received with the data from the L2 cache 265 and the load request unit 585 provides the encoding state to the processing unit 250 along with the data.

The coalesce unit 555 performs at least the functions as the previously described coalesce unit 255. The coalesce unit 555 receives processed data for multi-sample pixels and encoding state corresponding to the multi-sample pixels from the processing unit 250. The coalesce unit 555 may include a coalesce buffer 558 into which the processed data is stored. The coalesce buffer 558 may also be configured to store the per-pixel sample masks for sample subsets when the encoding state is subset. Alternatively, the per-pixel sample masks may be stored in the coverage tracking unit 575 and the coverage tracking unit 575 may be configured to track multi-sample pixel coverage as well as tile (or partial tile) coverage. The multi-sample coverage masks may be merged using bit-wise OR operations. When all of the bits in the stored multi-sample coverage mask for a multi-sample pixel are set, the multi-sample pixel is fully covered. However, if the coalesce unit 555 is configured to output processed multi-sample pixel data with an encoding state of subset, the separate per-pixel coverage masks for each subset should be stored separately. In one embodiment, a per-pixel sample mask is stored in coalesce buffer 558 with the processed multi-sample pixel data for each subset.

The coalesce unit 555 may also include the previously described analysis unit 500 that may be configured to analyze the multi-sample pixel data to determine if the multi-sample pixel data may be encoded with an encoding state of 1SPP, not 1SPP, or subset. The analysis unit 500 may determine the encoding state that is output to the L2 cache 265. In one embodiment, the encoding state is received with the data from the processing unit 250 and the coalesce unit 555 provides the encoding state to the L2 cache 265 along with the processed data.

When processed multi-sample data is received for a multi-sample pixel that has already been received for a tile being coalesced (i.e., at least one bit associated with the multi-sample pixel is set in the per-pixel sample coverage mask stored in the coverage tracking unit 575) the multi-sample data may be merged when the encoding state for the multi-sample pixel is subset if the new processed data equals the stored processed data. Otherwise, the new processed data is stored separately from the stored processed data and the per-pixel sample coverage mask stored in the coverage tracking unit 575 is updated to merge the new per-pixel sample coverage mask and the stored per-pixel sample coverage mask.

When the per-pixel encoding state differs for at least one multi-sample pixel in a tile, the processed data associated with a 1SPP encoding state may be replicated for each sample in the respective multi-sample pixel and processed data associated with a subset encoding state may be replicated for each sample in the respective subset. Then all of the processed data may be output with a tile mask and an encoding state of not 1SPP. Alternatively, the processed data may be output in two or three sub-flushes. A first sub-flush may include the processed data associated with the encoding state of 1SPP and a corresponding first mask. A second sub-flush may include the processed data associated with the encoding state of not 1SPP and a corresponding second tile flask. A third sub-flush may include the processed data associated with the encoding state of subset (including per-pixel sample masks) and a corresponding third tile mask. Finally, the processed data may be output with per-pixel encoding state and a tile mask, where the encoding state for each pixel may include the encoding state of subset which comprises two of more per-pixel sample masks.

In one embodiment, the coalesce buffer 558 stores the processed multi-sample pixel data as a list of pixel (x, y, processed data, per-pixel sample mask) values. The x,y coordinates may be tile-relative. The values are stored as an array of tuples where a new incoming processed data is stored in the next available index rather than relative to the x,y location of the multi-sample pixel. This may allow equal processed data values corresponding to different samples of a multi-sample pixel to be "merged" within the same entry of the coalesce buffer 558. In one embodiment the data values may be merged when the two values are within a threshold value of each other. In one embodiment, a different threshold value may be specified for each attribute. Therefore, color values may be merged using a different threshold value that is used for merging z values. In one embodiment, the coalesce buffer 558 may be implemented as a content-addressable memory (CAM). When the coalesce buffer 558 is flushed, the list of tuples may be output to the sent to L2 cache 265, or the processed data stored in the coalesce buffer 558 may be expanded to the format of not the 1SPP encoded state.

Figure 5B:
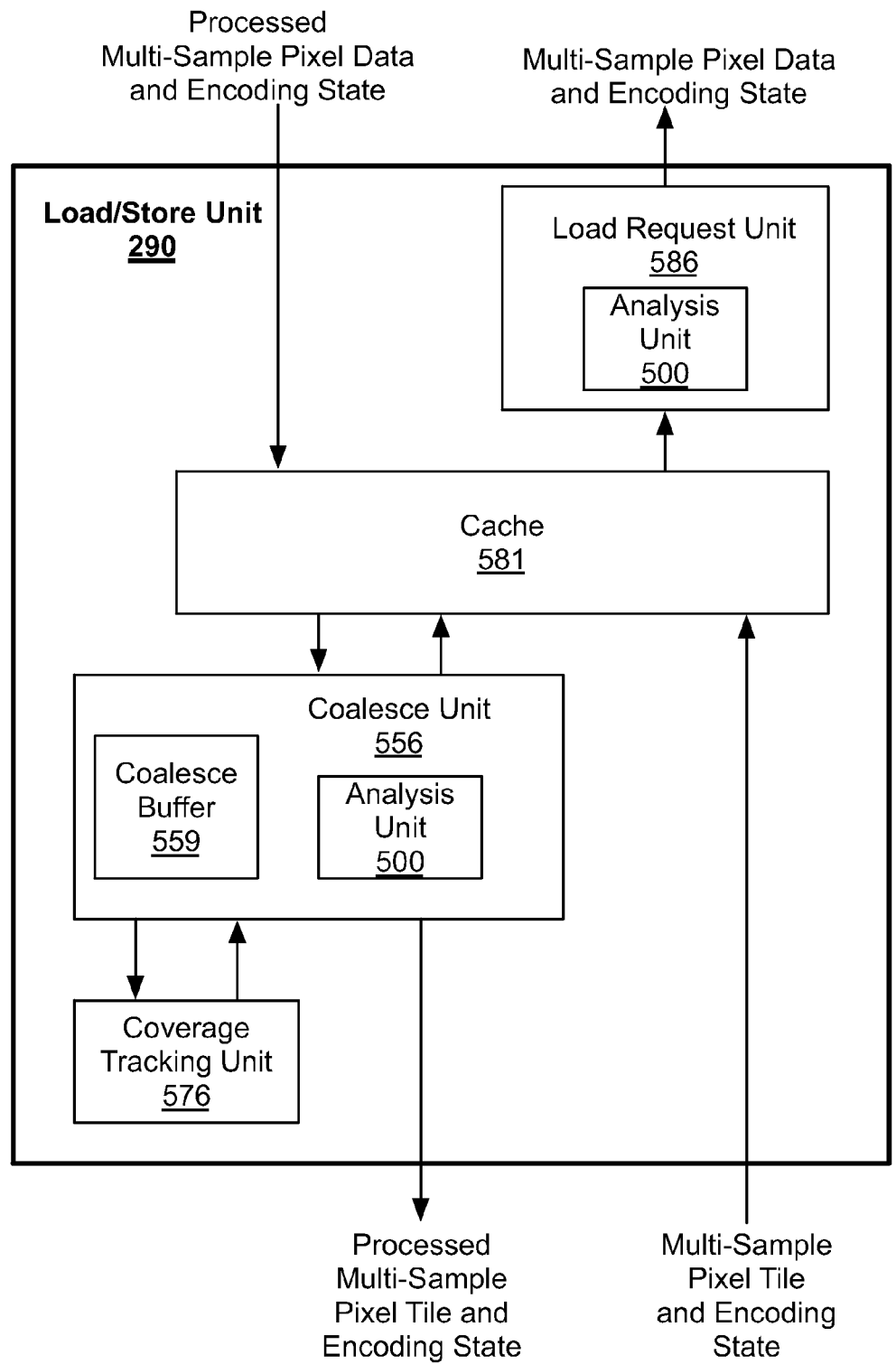
FIG. 5B illustrates another diagram of the Load/Store unit shown in FIG. 2B, in accordance with one embodiment.

FIG. 5B illustrates another diagram of the Load/Store unit 290 shown in FIG. 2B, in accordance with one embodiment. As shown in FIG. 5B, in one embodiment the Load/Store unit 290 comprises a cache 581, a load request unit 586, a coalesce unit 556, and a coverage tracking unit 576. The load request unit 586 and the coverage tracking unit 576 perform substantially the same functions as the previously described load request unit 585 and coverage tracking unit 575. The cache 581 performs substantially the same functions as the previously described cache 580. However, the cache 581 is configured to receive the processed multi-sample pixel data from the processing unit 250. In one embodiment, when the processed multi-sample pixel data that is received from the processing unit 250 has an encoded state of 1SPP, the processed multi-sample pixel data is replicated for all of the samples in the multi-sample pixel or portion of the multi-sample pixel and stored in the cache 581. Similarly, when the processed multi-sample pixel data that is received from the processing unit 250 has an encoded state of subset, the processed multi-sample pixel data is replicated for all of the samples in the subset of the multi-sample pixel and stored in the cache 581. When configured to operate in this manner, the encoding state does not need to be stored in the cache 581.

In one embodiment, the coalesce unit 556 is configured to snoop the writes to the cache 581 that are received from the processing unit 250 and update the tile coverage mask and per-pixel sample coverage masks maintained by the coverage tracking unit 576. When a tile is "full" the coalesce unit 556 reads the tile data from the cache 581. Entries in the cache 581 storing the data for the tile may be marked as empty and the bits in the coverage tracking unit 576 corresponding to the tile may be cleared when the tile is flushed.

In one embodiment, the coalesce unit 256, when the encoding state for the processed data that is flushed is not 1SPP, the analysis unit 500 within the coalesce unit 256 is configured to analyze the processed data. The analysis unit 500 may be configured to compare the values of the processed data for different samples of each multi-sample pixel and determine the encoding state for each pixel or for a tile of pixels in order to provide the encoding state to the L2 cache 265. The coalesce buffer 559 may be configured to store the processed data for different samples while the analysis is performed. The coalesce buffer 559 may also be configured to store the encoding state for each multi-sample pixel or portion of each multi-sample pixel as the processed data is analyzed.

When the coalesce buffer 559 is configured to output a partial tile, processed data for the partial tile may be flushed when the coverage tracking unit 576 indicates that store operations have been received for all of the samples of all of the multi-sample pixels in the partial tile. Entries in the cache 581 storing the data for the partial tile may be marked as empty and the bits in the coverage tracking unit 576 corresponding to the partial tile may be cleared when the partial tile is flushed.

Under certain conditions a tile may be flushed by the coalesce unit 556 before processed data for all of the multi-sample pixels in the tile are received from the processing unit 250 or when the tile is not "full". A first condition is that processed data is received for a "new" tile and storage is not available in the cache 581 to coalesce a new tile. The second condition is that the processed data is for a sample of a multi-sample pixel that has already been received for a tile being coalesced (i.e., the bit associated with the sample of the multi-sample pixel is set in the coverage tracking unit 576). The coalesce unit 556 may flush the processed data that is already stored for the tile to begin coalescing the tile again with the new processed data. Alternatively, the coalesce unit 556 may flush one or more entries in the cache 581 that are occupied by the stored processed data and store the new processed data in the one or more entries.

When an incomplete tile (i.e., a tile that is not "full") is flushed, the load/store unit 290 outputs the processed data for the multi-sample pixels that have been received from the processing unit 250. The tile coverage information maintained in the tracking unit 576 may be used by the coalesce unit 556 to determine which multi-sample pixels are flushed. The processed pixel data may be flushed when a cache miss occurs for the cache 581. In one embodiment, the processing unit 250 is configured to process the data for samples that are within one tile in parallel to enable the load/store unit 290 to coalesce the sample into tiles that may be flushed to the L2 cache 265 as "full" tiles.

The processed data for the multi-sample pixels that are flushed may all have the same encoding state or an encoding state may be stored in the coalesce buffer 559 or the cache 581 for each multi-sample pixel or for each sample subset of a multi-sample pixel. The processed data for the incomplete tile may be output with a single encoding state or with an encoding state for each multi-sample pixel (per-pixel encoding state) or sample subset of a multi-sample pixel. When all of the multi-sample pixels have the same encoding state, the processed data may be output with a tile mask indicating which of the multi-sample pixels are included in the flush. When encoding state is maintained for each multi-sample pixel, the coalesce unit 556 may be configured to examine the per-pixel or per-subset encoding state for the tile. When all of the per-pixel encoding state is the same, the processed data may be output with a tile mask indicating which of the multi-sample pixels are included in the flush. Per-pixel sample masks will be output by the coalesce unit 556 when the encoding state is subset.

When the per-pixel encoding state differs for at least one multi-sample pixel in a tile, the processed data associated with a 1SPP encoding state may be replicated for each sample in the respective multi-sample pixel and processed data associated with a subset encoding state may be replicated for each sample in the respective subset. Then all of the processed data may be output with a tile mask and an encoding state of not 1SPP. When the per-pixel encoding state differs for at least one multi-sample pixel in a tile (i.e., subset and 1SPP), the processed data associated with the 1SPP encoding state may be encoded as a sample subset. Alternatively, the processed data may be output in two or three sub-flushes. A first sub-flush may include the processed data associated with the encoding state of 1SPP and a corresponding first tile mask. A second sub-flush may include the processed data associated with the encoding state of not 1SPP and a corresponding second tile mask. A third sub-flush may include the processed data associated with the encoding state of subset (including per-pixel sample masks) and a corresponding third tile mask. Finally, the processed data may be output with per-pixel encoding state and a tile mask, where the encoding state for each pixel may include the encoding state of subset which comprises two of more per-pixel sample masks.

Figure 5C:
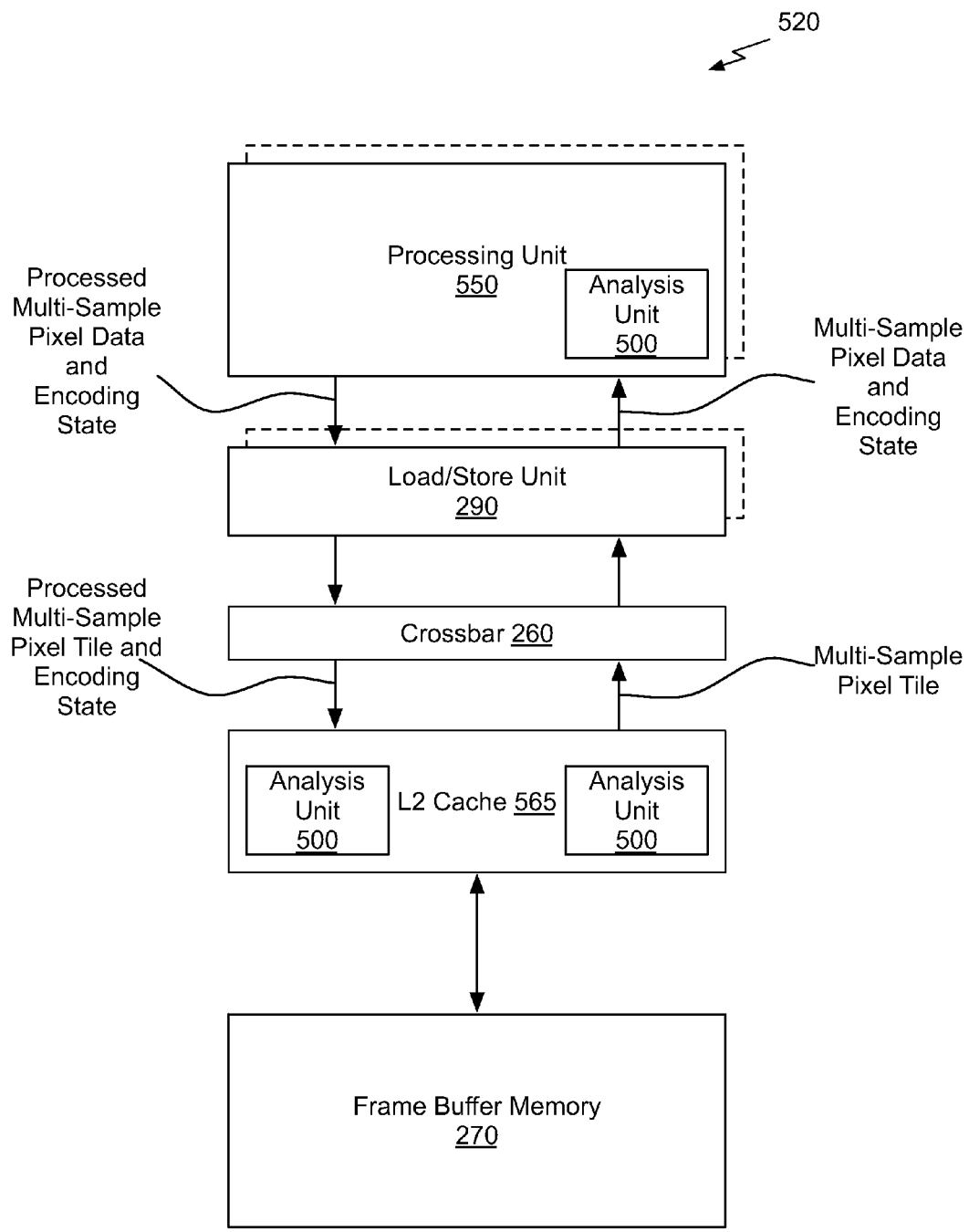
FIG. 5C illustrates another diagram of the various processing units and interconnects that are used during the multi-sample processing shown in FIG. 2B, in accordance with one embodiment.

FIG. 5C illustrates a diagram 520 of the various processing units and interconnections that are used during the multi-sample processing, in accordance with one embodiment. An L2 cache 265 performs the functions of the L2 cache 265 and may also include one or more analysis units 500 to analyze multi-sample pixel data and determine encoding state associated with the multi-sample pixel data. A processing unit 550 performs the function of the processing unit 250 and may also include an analysis unit 500 that is configured to analyze multi-sample pixel data received from the load/store unit 290 and determine encoding state associated with the multi-sample pixel data before processing the multi-sample pixel data.

Figure 6A:
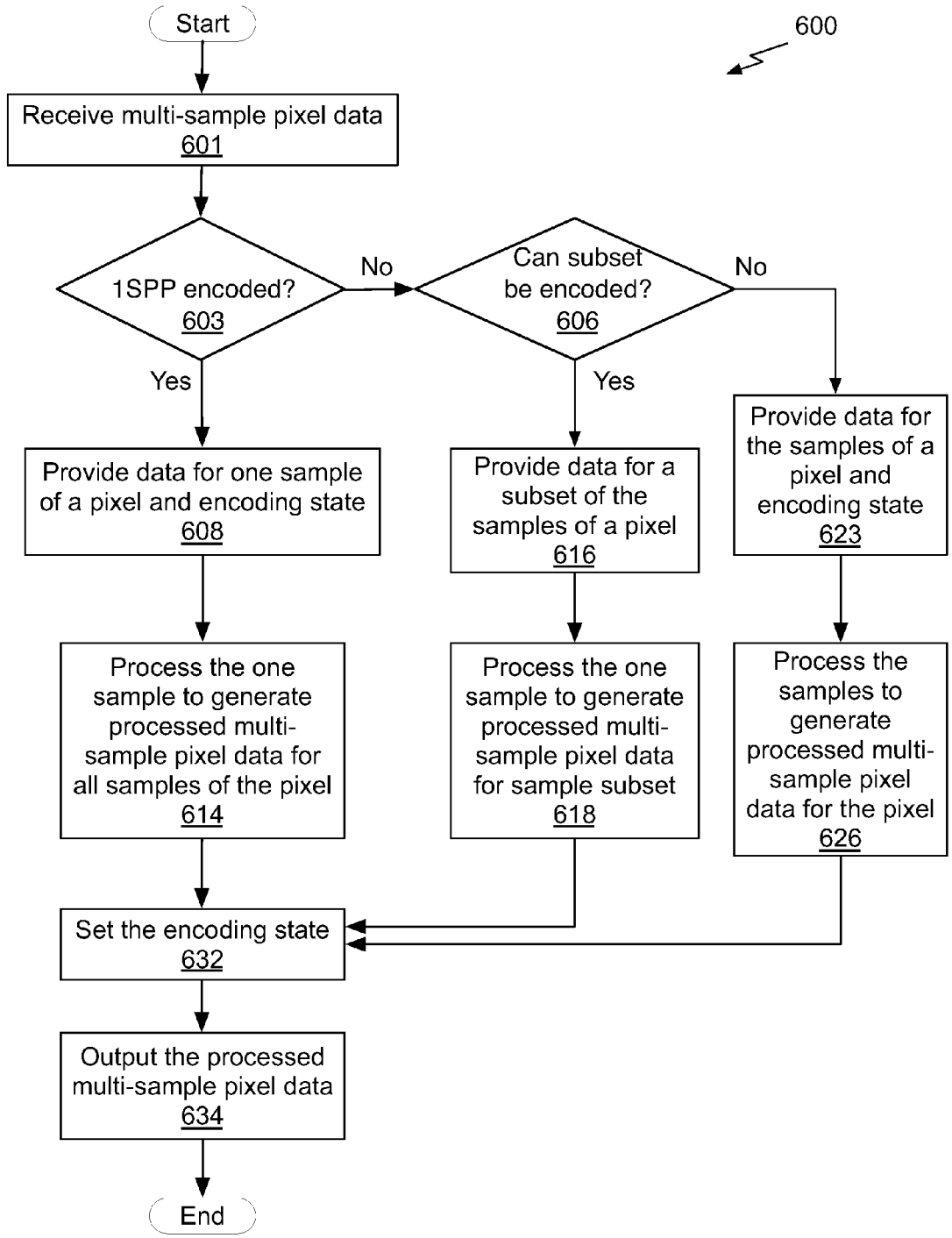
FIG. 6A illustrates another flowchart of a method for processing multi-sample data, in accordance with one embodiment.

FIG. 6A illustrates another flowchart of a method 600 for processing multi-sample data, in accordance with one embodiment. The steps shown in method 600 may be performed by a shader program that is executed by a graphics processor. At step 601, the load/store unit 290 receives multi-sample pixel data. At step 603, the load/store unit 290 determines if the encoding state associated with the multi-sample pixel data is 1SPP, and, if so, at step 608, the load/store unit 290 provides data for one sample of each multi-sample pixel or portion of a multi-sample pixel and the encoding state of 1SPP to the processing unit 254).

In one embodiment, the load/store unit 290 receives encoding state for the multi-sample pixels with the multi-sample pixel data, in another embodiment, the load/store unit 290 includes an analysis unit 500 and is configured to perform an analysis of the multi-sample pixel data to determine if the multi-sample pixel data may be associated with an encoded state of 1SPP or subset. At step 603, when the load/store unit 290 determines that the multi-sample pixel data may be encoded in 1SPP format by analyzing the multi-sample pixel data, the encoding state is set to 1SPP. At step 614, the one sample of the pixel is processed by the processing unit 250 to generate processed data for the all samples of the pixel or pixel portion.

If at step 603, the load/store unit 290 determines that the encoding state associated with the multi-sample pixel data is not 1SPP, then at step 606, the load/store unit 290 determines if the multi-sample pixel data may be associated with an encoded state of subset. At step 616, when the load/store unit 290 determines, by analyzing the multi-sample pixel data, that the multi-sample pixel data may be encoded with an encoding state of subset, the encoding state is set to subset and the corresponding per-pixel sample mask is included in the encoding state for each sample subset. At step 616, the encoding state is output to the processing unit 250 along with the data for one sample of each sample subset. At step 618, the one sample of the pixel is processed by the processing unit 250 to generate processed data for the all samples of the sample subset.

If at step 606, the load/store unit 290 determines that the encoding state associated with the multi-sample pixel data is not subset, then at step 623, the load/store unit 290 may provide data for all samples of each multi-sample pixel or each multi-sample pixel portion and the encoding state to the processing unit 250. At step 623, the encoding state is set to not 1SPP and is output to the processing unit 250 along with the data for all samples of each multi-sample pixel or each multi-sample pixel portion. At step 626, the processing unit 250 processes the data for all of the samples for each multi-sample pixel or each multi-sample pixel portion.

At step 632, the processing unit 250 sets the encoding state to 1SPP, subset, or not 1SPP based on the representation of the processed data. At step 634, the processing unit 250 outputs the processed data for each multi-sample pixel, each multi-sample pixel portion, or each sample subset to the Load/Store unit 290 along with the encoding state. The processed data may include data for the one sample or for all samples of a multi-sample pixel, one sample of each sample subset, one sample for all samples of a multi-sample pixel portion, or all samples of a multi-sample pixel.

Figure 6B:
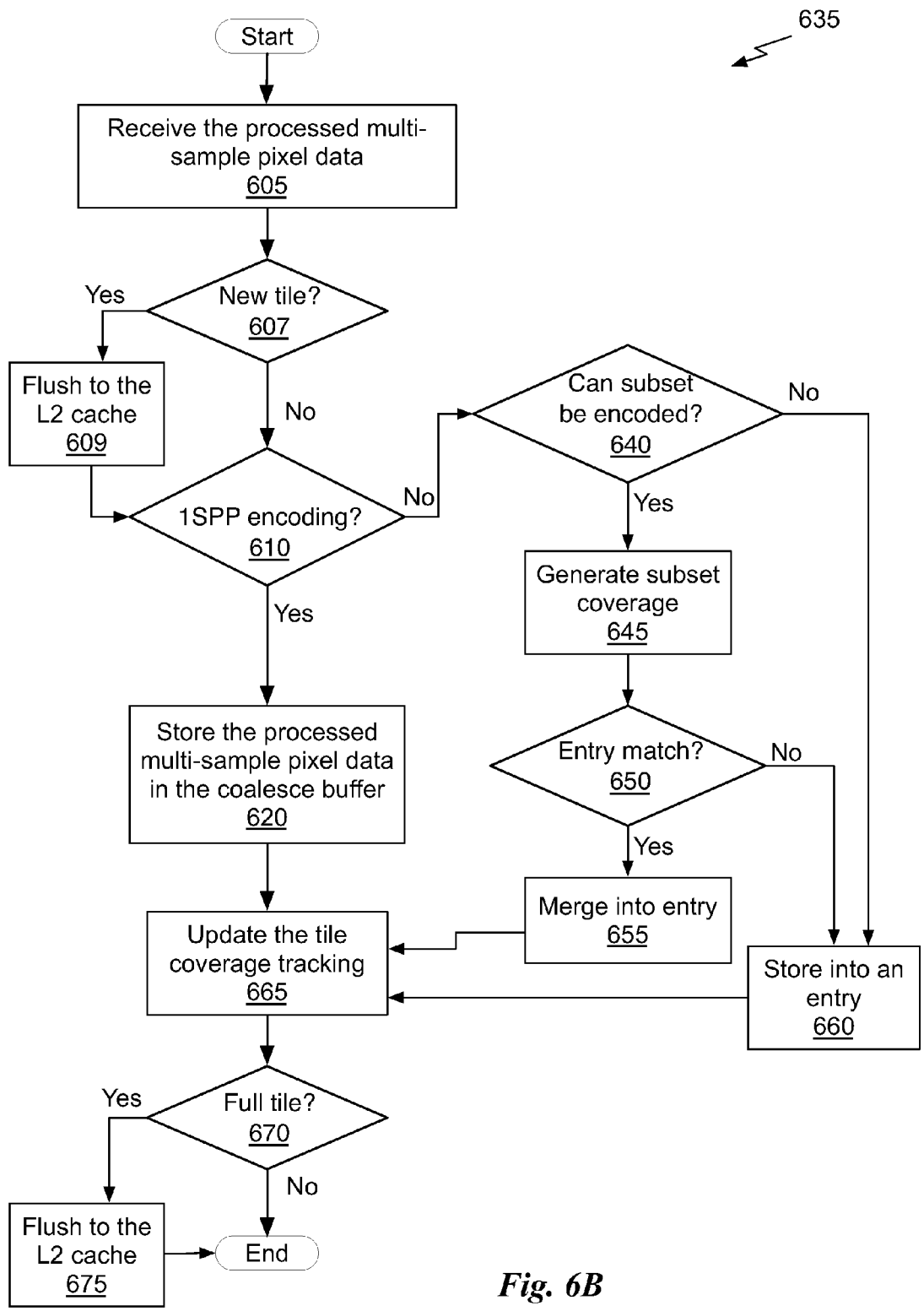
FIG. 6B illustrates another flowchart of a method for coalescing processing multi-sample data, in accordance with one embodiment.

FIG. 6B illustrates a flowchart of a method 635 for coalescing processing multi-sample data, in accordance with one embodiment. Although the steps shown in FIG. 6B are described as being performed by the Load/Store unit 290, one or more of the Load/Store unit 290, the L2 cache 265 (or 265), or the processing unit 250 (or 550) may be configured to perform the steps shown in FIG. 6B. The steps are described in the context of the Load/Store unit 290 shown in FIG. 5A. The steps may also be performed by the Load/Store unit 290 shown in FIG. 5B, with the cache 581 storing the processed data instead of the coalesce buffer 558.

At step 605, the Load/Store unit 290 receives the processed data for a multi-sample pixel from the processing unit 250. At step 607, the Load/Store unit 290 determines if a new tile is needed to store the processed data because the multi-sample pixel is not within a current tile that is stored in the coalesce buffer 558, and, if not, the Load/Store unit 290 proceeds to step 610. If, a new tile is needed, at step 609, the processed data for the current tile is flushed to the L2 cache 265 and the tile coverage is cleared in the coverage tracking unit 575 before the Load/Store unit 290 proceeds to step 610.

At step 610, the Load/Store unit 290 examines the encoding state that is provided by the processing unit 250 with the processed data and determines if the encoding state is 1SPP. When the encoding state is not 1SPP, at step 640 the Load/Store unit 290 determines if the processed data can be encoded as one or more subsets. The Load/Store unit 290 may perform an analysis of the processed data using the analysis unit 500 to determine the encoding state. If the processed data can be encoded as one or more subsets, at step 645 a per-pixel sample mask is generated for each subset. At step 650, the Load/Store unit 290 determines if an entry in the coalesce buffer 558 matches the x,y coordinates (or other unique identifier) for the multi-sample pixel. If a matching entry is found at step 650, then at step 655 the Load/Store unit 290 merges the processed data into the matching entry. Otherwise, at step 660, the Load/Store unit 290 stores the processed data in an empty entry of the coalesce buffer 558.

If, at step 640 the Load/Store unit 290 determines that one or more subsets cannot be encoded, then at step 660 the Load/Store unit 290 stores the processed data in an empty entry of the coalesce buffer 558. When the processed data cannot be encoded as ism) or subset, the encoding state is not 1SPP and processed data for each sample is stored for the multi-sample pixel. In another embodiment, the Load/Store unit 290 outputs the processed data to the L2 cache 265 when the encoding state is not 1SPP.

If, at step 610, the encoding state is 1SPP, at step 620, the Load/Store unit 290 stores the processed data for the multi-sample pixel in the coalesce buffer 558. At step 665, the Load/Store unit 290 updates the tile coverage stored in the coverage tracking unit 575. At step 670, the Load/Store unit 290 determines if a tile stored in the coalesce buffer 558 is fully covered, and, if so, the processed data for the fully covered tile is flushed to the L2 cache 265 and the tile coverage is cleared in the coverage tracking unit 575. Then the Load/Store unit 290 terminates handling of the process multi-sample pixel data that was received at step 605. The steps described in conjunction with FIG. 6B may also be performed for a partial tile when the coalesce buffer 558 is configured to store a partial tile instead of an entire tile.

When the data is the same for one or more subsets of samples of a multi-sample pixel, the subset encoding state may be used to reduce the memory footprint for storing the multi-sample pixel data and also reduce the bandwidth consumed to read, write, and transmit the multi-sample pixel data. Furthermore, in some cases, a processing unit, such as the processing unit 250 or 550, may be configured to process the single sample to generate processed multi-sample pixel data for the single sample that represents processed multi-sample pixel data for two or more samples, or even all of the samples of a multi-sample pixel.

Multi-Sample Load and Store Instructions

As previously described, a multi-sample load instruction (SULD.MS) may be supported that returns a sample mask indicating which samples are known to have the same value. The multi-sample load instruction also specifies an address or coordinates of a multi-sample pixel. In one embodiment, the multi-sample load instruction returns a predicate indicating whether the multi-sample pixel has an encoding state of not 1SPP (i.e., a separate value is stored for each sample of the multi-sample pixel). In another embodiment, the predicate indicates the encoding state of the multi-sample pixel, e.g., 1SPP, not 1SPP or subset.

In one embodiment, inputs to the multi-sample load instruction include a pixel address and sample identifier corresponding to one sample in the multi-sample pixel. In addition to returning the data for the one sample, the multi-sample load instruction also returns an integer sample mask indicating which other samples in the multi-sample pixel are known to have the same data as the one sample.

The multi-sample load instruction may be defined such that the sample mask can be computed opportunistically. For example, if the multi-sample pixel is known to be part of a tile having an encoding state of 1SPP, then the sample mask will indicate that all samples of the multi-sample pixel have the same data. When the encoding state of the multi-sample pixel is subset, the sample mask will indicate which samples are included in the same subset as the sample corresponding to the specified sample identifier. The load/store unit 290 or the L2 cache 265 may be configured to analyze the multi-sample pixel data and generate the per-pixel sample mask corresponding to the subset that includes the sample corresponding to the specified sample identifier. The generated per-pixel sample mask may be returned by the multi-sample load instruction as the sample mask. In one embodiment, the load/store unit 290 or the L2 cache 265 analyzes the other samples stored in a cache line to generate the sample mask, so the sample mask may not represent all of the samples in the subset when data for all of the samples cannot be stored in a single cache line.

Additionally, a multi-sample store instruction (SUST.MS) may be supported that accepts a sample mask, where a value provided with the multi-sample store instruction is stored to every sample of a multi-sample pixel that is enabled according to the specified sample mask. In one embodiment, a sample mask that indicates a fully covered pixel may be stored in a 1SPP format, as shown in FIG. 6B. In another embodiment, a sample mask that indicates a partially covered pixel may be stored in a subset encoding.

The code shown in Table 1 illustrates an example of how the SUST.MS and SULD.MS instructions may be used in a shader program to compute and store a function of values of samples in a pixel that are covered by a primitive.

TABLE 1

```
coverageMask = PIXLD.COVERAGE;    // read the pixel coverage mask
while (coverageMask) {
    // choose the sample of first set bit
    int samp = BitScanForward(coverageMask);
    (mask, color) = SULD.MS Rd, [Ra=x,y,sample = samp]
    Generate processed data
    // store to all covered samples that have the same color
    SUST.MS [Ra=x,y, samplemask = coverageMask & mask]
    coverageMask &= ~mask;
}
```

The pixel coverage mask indicates the sample coverage of a new primitive regardless of the values that are stored for each sample (not the sample coverage for a subset where the samples all store the same data). In each iteration of the loop, the value of one sample that is covered according to the coverageMask is loaded using the SULD.MS instruction. The SULD.MS instruction returns the per-pixel sample mask (or per-cache line sample mask). The value of the requested sample is processed to generate a processed value.

The processed data for the one sample is returned and stored to all samples that have the same value as the one sample (according to the per-pixel sample mask) and that are covered by the new primitive. The coverageMask is bit-wise ANDed with the per-pixel sample mask to ensure only samples that are covered by the new primitive are written. The coverageMask is then updated based on the samples that were written by SUST.MS. The loop is only executed for each sample subset rather than executing for each sample that is covered according to the pixel coverage mask.

In one embodiment, the analyze unit 500 is implemented as fixed-function circuitry that is configured to implement comparison operations to compute the per-pixel sample mask that is returned by the SUDAN instruction. An example implementation uses a 32 Byte cache line size, and includes eight 4 Byte comparators. Groups of four bytes are multiplexed into the inputs of the comparators depending on the data format of the multi-sample pixel. For example, when the data format is 4BPP (e.g. RGBA8), the 8 comparators perform comparisons for 8 dwords (datawords, where a dataword is 4 bytes):

```
dword[i] == dword[0]
dword[i] == dword[1]
dword[i] == dword[2]
dword[i] == dword[3]
dword[i] == dword[4]
dword[i] == dword[5]
dword[i] == dword[6]
dword[i] == dword[7]
``` where <i> is the sample being fetched. Depending on the multi-sample mode (i.e., number of samples per-pixel), the appropriate comparisons can be merged into the per-pixel sample mask that is returned. The multi-sample mode of 8×AA (8 samples per-pixel) uses all eight comparisons, 4×AA (4 samples per-pixel) uses half of the comparisons, and so on.

If the data format of the multi-sample pixel is 8BPP (e.g. RGBA16F), the comparisons may be arranged as follows:

```
dword[2*i+0] == dword[0] (lower half of sample 0)
dword[2*i+1] == dword[1] (upper half of sample 0)
dword[2*i+0] == dword[2] (lower half of sample 1)
dword[2*i+1] == dword[3] (upper half of sample 1)
dword[2*i+0] == dword[4] (lower half of sample 2)
dword[2*i+1] == dword[5] (upper half of sample 2)
dword[2*i+0] == dword[6] (lower half of sample 3)
dword[2*i+1] == dword[7] (upper half of sample 3)
```

If the multi-sample mode is 4×AA, then the arrangement shown above can compare all of the samples in a pixel. If the multi-sample mode is 8×AA, then the arrangement shown above will only compare half of the samples in the pixel and the per-pixel sample mask represents a portion of the multi-sample pixel or another set of comparisons is performed to generate the per-pixel sample mask for the entire multi-sample pixel.

An alternate embodiment, filtering circuitry may be used to perform the comparisons. For example, the Load/Store Unit 290 may implement MIN and MAX filtering modes that modes take a bilinear footprint (four texels) and, rather than computing a weighted average, are configured to compute a component-wise minimum or maximum of the four texel values. In one embodiment the Load/Store Unit 290 includes a texture unit that is configured to perform texture operations. The texture unit may include at least four texels worth of comparators, which can be be configured to perform equality comparisons, as well as the MIN and MAX filtering mode operations. Similarly, the Load/Store Unit 290 may support depth (z) comparison operations (i.e., to compare sampled values against a shader-provided "reference" value), which may be used to perform comparisons for depth values.

Parallel Processing System

Figure 7:
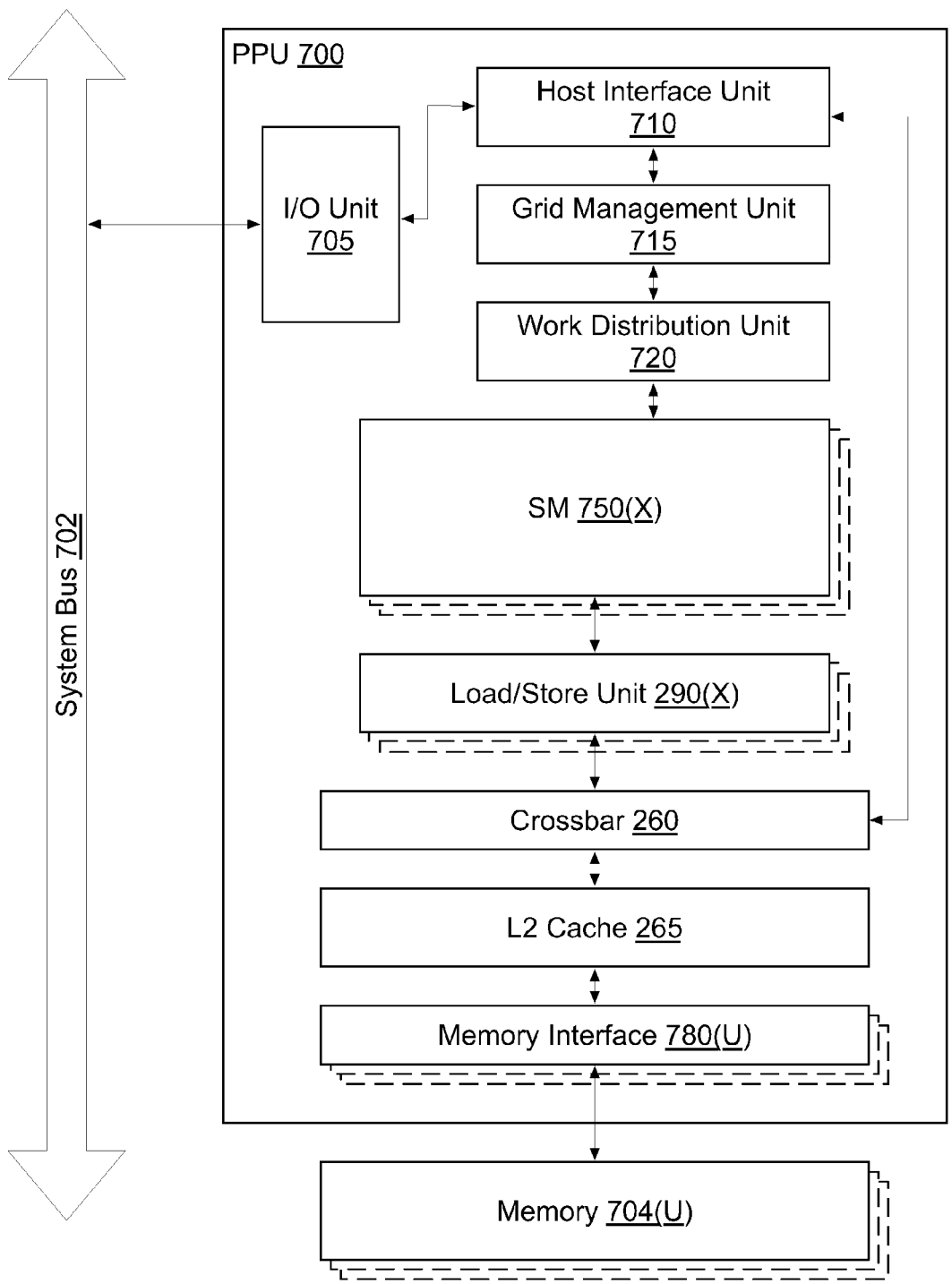
FIG. 7 illustrates a parallel processing unit (PPU), according to one embodiment.

FIG. 7 illustrates a parallel processing unit (PPU) 700, according to one embodiment. While a parallel processor is provided herein as an example of the PPU 700, it should be strongly noted that such processor is set forth for illustrative purposes only, and any processor may be employed to supplement anchor substitute for the same. In one embodiment, the PPU 700 is configured to execute a plurality of threads concurrently in two or more streaming multi-processors (SMs) 750. In one embodiment, the processing unit 250 and 550 are implemented as SMs 750. A thread (i.e., a thread of execution) is an instantiation of a set of instructions executing within a particular SM 750. Each SM 750, described below in more detail in conjunction with FIG. 8, may include, but is not limited to, one or more processing cores, a level-one (L1) cache, shared memory, and the like.

In one embodiment, the PPU 700 includes an input/output (I/O) unit 705 configured to transmit and receive communications (i.e., commands, data, etc.) from a central processing unit (CPU) (not shown) over the system bus 702. The I/O unit 705 may implement a Peripheral Component Interconnect Express (PCIe) interface for communications over a PCIe bus. In alternative embodiments, the I/O unit 705 may implement other types of well-known bus interfaces.

The PPU 700 also includes a host interface unit 710 that decodes the commands and transmits the commands to the grid management unit 715 or other units of the PPU 700 (e.g., memory interface 780) as the commands may specify. The host interface unit 710 is configured to route communications between and among the various logical units of the PPU 700.

In one embodiment, a program encoded as a command stream is written to a buffer by the CPU. The buffer is a region in memory, e.g., memory 704 or system memory, that is accessible (i.e., read/write) by both the CPU and the PPU 700. The CPU writes the command stream to the buffer and then transmits a pointer to the start of the command stream to the PPU 700. The host interface unit 710 provides the grid management unit (GMU) 715 with pointers to one or more streams. The GMU 715 selects one or more streams and is configured to organize the selected streams as a pool of pending grids. The pool of pending grids may include new grids that have not yet been selected for execution and grids that have been partially executed and have been suspended.

A work distribution unit 720 that is coupled between the GMU 715 and the SMs 750 manages a pool of active grids, selecting and dispatching active grids for execution by the SMs 750. Pending grids are transferred to the active grid pool by the GMU 715 when a pending grid is eligible to execute, i.e. has no unresolved data dependencies. An active grid is transferred to the pending pool when execution of the active grid is blocked by a dependency. When execution of a grid is completed, the grid is removed from the active grid pool by the work distribution unit 720. In addition to receiving grids from the host interface unit 710 and the work distribution unit 720, the GMU 715 also receives grids that are dynamically generated by the SMs 750 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 700. An application may include instructions (i.e., API calls) that cause the driver kernel to generate one or more grids for execution. In one embodiment, the PPU 700 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 700 comprises X SMs 750(X). For example, the PPO 100 may include 15 distinct SMs 750. Each SM 750 is multi-threaded and configured to execute a plurality of threads (e.g., 32 threads) from a particular thread block concurrently. Each of the SMs 750 is connected to a level-two (L2) cache 265 via a Load/Store unit 290 and a crossbar 260 (or other type of interconnect network). The Load/Store unit 290 is configured to perform load and store operations received from the SM 750, as previously described.

The L2 cache 265 is connected to one or more memory interfaces 780. Memory interfaces 780 implement 16, 32, 64, 128-bit data buses, or the like, for high-speed data transfer. In one embodiment, the PPU 700 comprises U memory interfaces 780(U), where each memory interface 780(U) is connected to a corresponding memory device 704(U). For example, PPU 700 may be connected to up to 6 memory devices 704, such as graphics double-data-rate, version 5, synchronous dynamic random access memory (GDDR5 SDRAM).

In one embodiment, the PPU 700 implements a multi-level memory hierarchy. The memory 704 is located off-chip in SDRAM coupled to the PPU 700. Data from the memory 704 may be fetched and stored in the L2 cache 265, which is located on-chip and is shared between the various SMs 750. The L2 cache 265 may be replaced with the L2 cache 565. In one embodiment, each of the SMs 750 also implements an L1 cache. The L1 cache is private memory that is dedicated to a particular SM 750. Each of the L1 caches is coupled to the shared L2 cache 265. Data from the L2 cache 265 may be fetched and stored in each of the L1 caches for processing in the functional units of the SMs 750.

In one embodiment, the PPU 700 comprises a graphics processing unit (GPU). The PPU 700 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 700 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc.

For example, the GMU 715 may configure one or more SMs 750 to execute a vertex shader program that processes a number of vertices defined by the model data. In one embodiment, the GMU 715 may configure different SMs 750 to execute different shader programs concurrently. For example, a first subset of SMs 750 may be configured to execute a vertex shader program while a second subset of SMs 750 may be configured to execute a pixel shader program. The first subset of SMs 750 processes vertex data to produce processed vertex data and writes the processed vertex data to the L2 cache 265 and/or the memory 704 via the LoadStore units 290 and the crossbar 260. After the processed vertex data is rasterized (i.e., transformed from three-dimensional data into two-dimensional data in screen space) to produce fragment data, the second subset of SMs 750 executes a pixel shader to produce processed fragment data, which is then blended with other processed fragment data and written to the frame buffer in memory 704. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 700 may be included in a desktop computer, a laptop computer, a tablet computer, a smart-phone (e.g., a wireless, hand-held device), personal digital assistant (PDA), digital camera, a hand-held electronic device, and the like. In one embodiment, the PRI 700 is embodied on a single semiconductor substrate. In another embodiment, the PPU 700 is included in a system-on-a-chip (SoC) along with one or more other logic units such as a reduced instruction set computer (RISC) CPU, a memory management unit (MMU), a digital-to-analog converter (DAC), and the like.

In one embodiment, the PHI 700 may be included on a graphics card that includes one or more memory devices 704 such as GDDR5 SDRAM. The graphics card may be configured to interface with a PCIe slot on a motherboard of a desktop computer that includes, e.g., a northbridge chipset and a southbridge chipset. In yet another embodiment, the PPU 700 may be an integrated graphics processing unit (iGPU) included in the chipset (i.e., Northbridge) of the motherboard.

Figure 8:
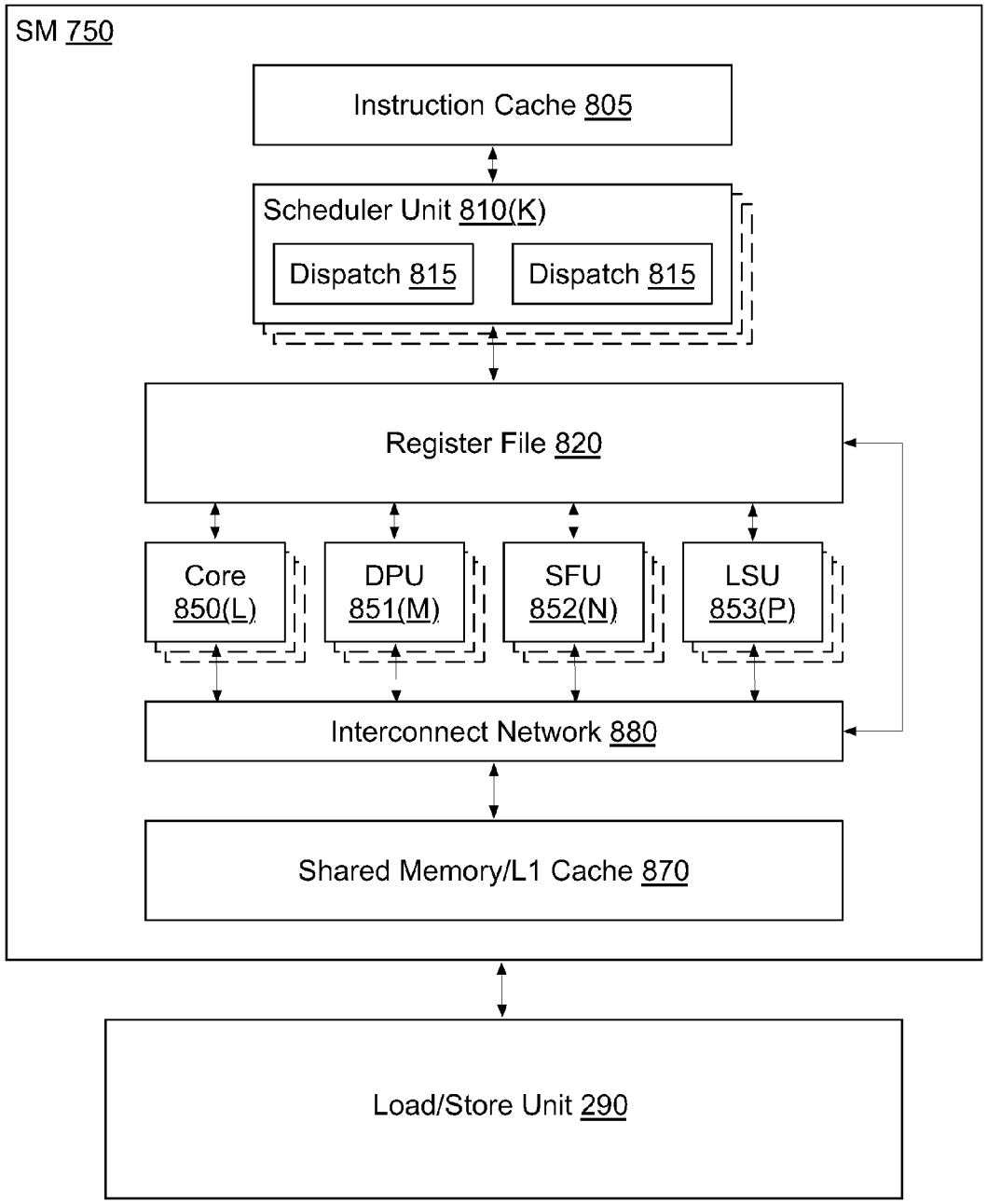
FIG. 8 illustrates the streaming multi-processor of FIG. 5, according to one embodiment.

FIG. 8 illustrates the streaming multi-processor 750 of FIG. 5, according to one embodiment. As shown in FIG. 8, the SM 750 includes an instruction cache 805, one or more scheduler units 810, a register file 620, one or more processing cores 850, one or more double precision units (DPUs) 851, one or more special function units (SFUs) 852, one or more load/store units (LSUs) 853, an interconnect network 880, and a shared memory/L1 cache 870. The SM 750 is coupled to a Load/Store unit 290. The Load/Store unit 290 may include one or more texture units in addition to the units shown in FIG. 2C.

In one embodiment, the SM 750 and Load/Store unit 290 are implemented within a GPU. In such an embodiment, the Load/Store unit 290 comprises one or more texture units that are configured to load texture maps (i.e., a 2D array of texels) from the memory 704 and sample the texture maps to produce sampled texture values for use in shader programs. The texture units implement texture operations such as anti-aliasing operations using mip-maps (i.e., texture maps of varying levels of detail).

As described above, the work distribution unit 720 dispatches active grids for execution on one or more SMs 750 of the PPU 700. The scheduler unit 810 receives the grids from the work distribution unit 720 and manages instruction scheduling for one or more thread blocks of each active grid. The scheduler unit 810 schedules threads for execution in groups of parallel threads, where each group is called a warp. In one embodiment, each warp includes 32 threads. The scheduler unit 810 may manage a plurality of different thread blocks, allocating the thread blocks to warps for execution and then scheduling instructions from the plurality of different warps on the various functional units (i.e., cores 850, DPUs 851, SFUs 852, and LSUs 853) during each clock cycle.

In one embodiment, each scheduler unit 810 includes one or more instruction dispatch units 815. Each dispatch unit 815 is configured to transmit instructions to one or more of the functional units. In the embodiment shown in FIG. 8, the scheduler unit 810 includes two dispatch units 815 that enable two different instructions from the same warp to be dispatched during each clock cycle. In alternative embodiments, each scheduler unit 810 may include a single dispatch unit 815 or additional dispatch units 815.

Each SM 750 includes a register file 820 that provides a set of registers for the functional units of the SM 750. In one embodiment, the register file 820 is divided between each of the functional units such that each functional unit is allocated a dedicated portion of the register file 820. In another embodiment, the register file 820 is divided between the different warps being executed by the SM 750. The register file 820 provides temporary storage for operands connected to the data paths of the functional units.

Each SM 750 comprises L processing cores 850. In one embodiment, the SM 750 includes a large number (e.g., 192, etc.) of distinct processing cores 850. Each core 850 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 750 also comprises M DPUs 851 that implement double-precision floating point arithmetic, N SFUs 852 that perform special functions (e.g., copy rectangle, pixel blending operations, and the like), and P LSUs 853 that implement load and store operations between the shared memory/L1 cache 870 and the register file 820. In one embodiment, the SM 750 includes 64 DPUs 851, 32 SFUs 852, and 32 LSUs 853.

Each SM 750 includes an interconnect network 880 that connects each of the functional units to the register file 820 and the shared memory/L1 cache 870. In one embodiment, the interconnect network 880 is a crossbar that can be configured to connect any of the functional units to any of the registers in the register file 820 or the memory locations in shared memory/L1 cache 870.

The PPU 700 described above may be configured to perform highly parallel computations much faster than conventional CPUs. Parallel computing has advantages in graphics processing, data compression, biometrics, stream processing algorithms, and the like.

Figure 9:
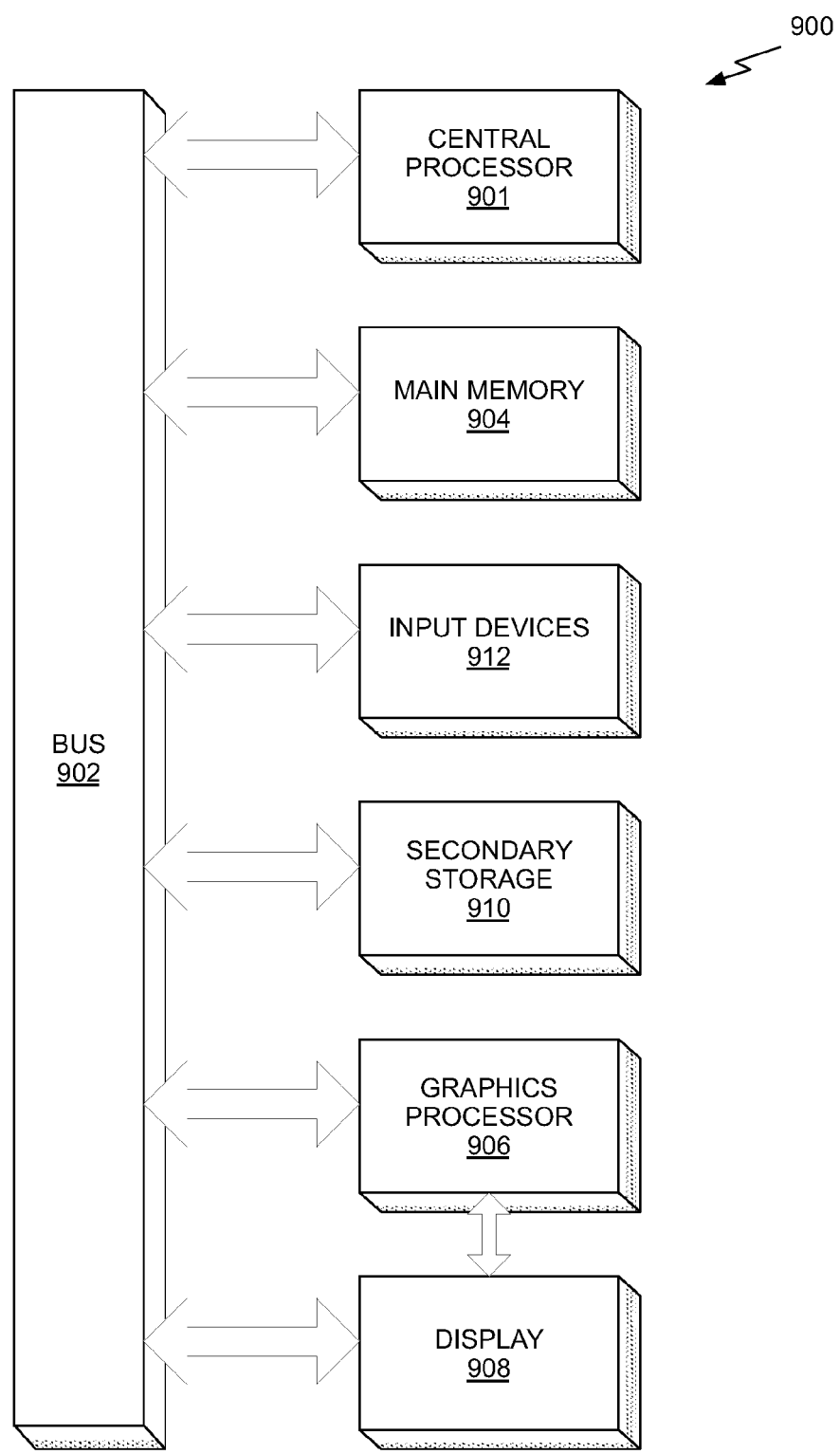
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The compiler program may be executed by the central processor 901 or the graphics processor 906. The main memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   processing, by two or more threads, a first primitive covering two or more samples of a multi-sample pixel that comprises multiple samples to generate data for the two or more samples of the multi-sample pixel;
   processing, by a single thread, a second primitive covering a subset of the multiple samples to generate data for a single sample of the multi-sample pixel;
   receiving, by a load/store unit, a multi-sample store instruction that specifies the data for the single sample of the multi-sample pixel samples and a sample mask, wherein a pixel coverage mask indicates the sample coverage of the second primitive and the sample mask indicates the subset of the multiple samples that are covered by the second primitive and are associated with the data for the single sample; and
   in response to executing the multi-sample store instruction, storing the data for the single sample to at least two samples of the multi-sample pixel that are enabled according to the sample mask.

2. The method of claim 1, further comprising associating the multi-sample pixel with an encoding state that indicates the data for the single sample represents data for less than all samples of the multi-sample pixel.

3. The method of claim 2, wherein the encoding state is associated with a tile including the multi-sample pixel and one or more additional multi-sample pixels.

4. The method of claim 3, further comprising determining the single sample represents the entire multi-sample pixel and one or more additional multi-sample pixels in a tile including the multi-sample pixel and the one or more additional multi-sample pixels.

5. The method of claim 1, further comprising transmitting the sample mask and data for the single sample to a cache or processing unit that expands the data for the single sample based on the sample mask.

6. A system comprising:
   a memory storing multi-sample pixel data;
   a processing unit configured to:
      process, by two or more threads, a first primitive covering two or more samples of a multi-sample pixel that comprises multiple samples to generate data for the two or more samples of the multi-sample pixel;
      process, by a single thread, a second primitive covering a subset of the multiple samples to generate data for a single sample of the multi-sample pixel; and
   a load/store unit that is coupled between the processing unit and the memory, and
   configured to:
      receive a multi-sample store instruction that specifies data for a single sample of the multi-sample pixel and a sample mask, wherein a pixel coverage mask indicates the sample coverage of the second primitive and the sample mask indicates the subset of the multiple samples that are covered by the second primitive and are associated with the data for the single sample; and
      store the data for the single sample to at least two samples of the multi-sample pixel that are enabled according to the sample mask in response to executing the multi-sample store instruction.

7. The system of claim 6, where the load/store unit is further configured to determine the single sample represents the entire multi-sample pixel and one or more additional multi-sample pixels in a tile including the multi-sample pixel and the one or more additional multi-sample pixels.

8. A non-transitory computer-readable storage medium storing instructions that, when executed by a processor, cause the processor to perform steps comprising:
  processing, by two or more threads, a first primitive covering two or more samples of a multi-sample pixel that comprises multiple samples to generate data for the two or more samples of the multi-sample pixel;
  processing, by a single thread, a second primitive covering a subset of the multiple samples to generate data for a single sample of the multi-sample pixel;
  receiving a multi-sample store instruction that specifies data for a single sample of the multi-sample pixel and a sample mask, wherein a pixel coverage mask indicates the sample coverage of the second primitive and the sample mask indicates the subset of the multiple samples that are covered by the second primitive and are associated with the data for the single sample; and
  in response to executing the multi-sample store instruction, storing the data for the single sample to at least two samples of the multi-sample pixel that are enabled according to the sample mask.

9. A method, comprising:
  receiving a multi-sample load instruction that specifies one sample of a multi-sample pixel that comprises multiple samples, wherein the multiple samples includes a first subset of samples associated with a first encoding state and a second subset of samples associated with a second encoding state;
  in response to executing the multi-sample load instruction, receiving data for one sample of the multi-sample pixel, wherein the one sample and at least one additional sample of the multiple samples is included in the first subset; and
  determining the first encoding state indicating that the data for the one sample of the multi-sample pixel represents multi-sample pixel data for the first subset, wherein the first subset is stored in a first cache line and the second subset is stored in a second cache line.

10. The method of claim 9, wherein the determining comprises receiving a predicate indicating the first encoding state in response to executing the multi-sample load instruction.

11. The method of claim 9, wherein the first encoding state is read from a memory.

12. The method of claim 9, wherein the first encoding state comprises a sample mask indicating which other samples in the first subset are represented by the data for the one sample.

13. The method of claim 9, wherein the first encoding state is associated with a tile including the multi-sample pixel and one or more additional multi-sample pixels.

14. The method of claim 9, wherein the determining comprises analyzing the multi-sample pixel data to identify that the data for the one sample represents multi-sample pixel data for all samples in the first subset.

15. The method of claim 9, wherein the determining comprises computing a component-wise minimum or maximum of four samples within the first subset.

16. A system comprising:
  a memory storing multi-sample pixel data; and
  an analysis unit that is coupled to the memory and configured to:
    receive a multi-sample load instruction that specifies one sample of a multi-sample pixel that comprises multiple samples, wherein the multiple samples includes a first subset of samples associated with a first encoding state and a second subset of samples associated with a second encoding state;
    in response to executing the multi-sample load instruction, receive data for one sample of the multi-sample pixel, wherein the one sample and at least one additional sample of the multiple samples is included in the first subset; and
    determine the first encoding state indicating that the data for the one sample of the multi-sample pixel represents multi-sample pixel data for the first subset, wherein the first subset is stored in a first cache line and the second subset is stored in a second cache line.

17. The system of claim 16, wherein the analysis unit resides within one or more of a load/store unit, a cache, and a processing unit.

18. The system of claim 16, wherein the first encoding state is received by the analysis unit.

19. The system of claim 16, wherein the analysis unit is further configured to compute a component-wise minimum or maximum of four samples within the first subset to determine the first encoding state.

20. A non-transitory computer-readable storage medium storing instructions that, when executed by a processor, cause the processor to perform steps comprising:
  receiving a multi-sample load instruction that specifies one sample of a multi-sample pixel that comprises multiple samples, wherein the multiple samples includes a first subset of samples associated with a first encoding state and a second subset of samples associated with a second encoding state;
  in response to executing the multi-sample load instruction, receiving data for one sample of the multi-sample pixel, wherein the one sample and at least one additional sample of the multiple samples is included in the first subset; and
  determining the first encoding state indicating that the data for the one sample of the multi-sample pixel represents multi-sample pixel data for the first subset, wherein the first subset is stored in a first cache line and the second subset is stored in a second cache line.

* * * * *